United States Patent
Fisher et al.

(10) Patent No.: US 9,454,256 B2
(45) Date of Patent: Sep. 27, 2016

(54) SENSOR CONFIGURATIONS OF AN INPUT DEVICE THAT ARE SWITCHABLE BASED ON MODE

(75) Inventors: Joseph Fisher, Cupertino, CA (US); Erturk Kocalar, Cupertino, CA (US); Rishabh Bhargava, Cupertino, CA (US); Lakshman Rathnam, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 1252 days.

(21) Appl. No.: 12/205,786

(22) Filed: Sep. 5, 2008

(65) Prior Publication Data

US 2009/0229892 A1   Sep. 17, 2009

Related U.S. Application Data

(60) Provisional application No. 61/036,804, filed on Mar. 14, 2008.

(51) Int. Cl.
| | |
|---|---|
| *G06F 3/041* | (2006.01) |
| *G06F 3/0346* | (2013.01) |
| *G06F 3/044* | (2006.01) |
| *G06F 3/0488* | (2013.01) |
| *G06F 1/16* | (2006.01) |

(52) U.S. Cl.
CPC ............ *G06F 3/0416* (2013.01); *G06F 1/169* (2013.01); *G06F 1/1626* (2013.01); *G06F 3/0346* (2013.01); *G06F 3/044* (2013.01); *G06F 3/04883* (2013.01)

(58) Field of Classification Search
CPC .... G06F 3/0346; G06F 3/0416; G06F 3/044; G06F 3/04883; G06F 1/1626; G06F 1/169
USPC ...................... 345/156–184; 178/18.01–20.04
See application file for complete search history.

(56) References Cited

U.S. PATENT DOCUMENTS

| 1,061,578 A | 5/1913 | Wischhusen et al. |
| 2,063,276 A | 12/1936 | Thomas |

(Continued)

FOREIGN PATENT DOCUMENTS

| CN | 1139235 | 1/1997 |
| CN | 1455615 | 11/2003 |

(Continued)

OTHER PUBLICATIONS

Tsuk et al., U.S. Office Action mailed Apr. 19, 2011, directed to U.S. Appl. No. 11/610,190; 25 pages.

(Continued)

*Primary Examiner* — Ryan A Lubit
(74) *Attorney, Agent, or Firm* — Morrison & Foerster LLP

(57) ABSTRACT

An input device with switchable sensor configurations. In one embodiment, the input device can switch between a sensor configuration in which each of its sensor elements is enabled to sense input and a sensor configuration in which only a subset of its sensor elements are enabled to sense input. In another embodiment, the input device can switch between a sensor configuration in which each of its sensor elements is enabled to sense input and a sensor configuration in which one or more groupings of its sensor elements are enabled to collectively sense input. In a further embodiment, the input device can operate in a detection mode that switches between sensor configurations to determine a position of an input.

20 Claims, 21 Drawing Sheets

(56) References Cited

U.S. PATENT DOCUMENTS

| | | |
|---|---|---|
| 2,798,907 A | 7/1957 | Schneider |
| 2,903,229 A | 9/1959 | Landge |
| 2,945,111 A | 7/1960 | McCormick |
| 3,005,055 A | 10/1961 | Mattke |
| 3,965,399 A | 6/1976 | Walker et al. |
| 3,996,441 A | 12/1976 | Ohashi |
| 4,029,915 A | 6/1977 | Ojima |
| 4,103,252 A | 7/1978 | Bobick |
| 4,110,749 A | 8/1978 | Janko et al. |
| 4,115,670 A | 9/1978 | Chandler |
| 4,121,204 A | 10/1978 | Welch et al. |
| 4,129,747 A | 12/1978 | Pepper |
| 4,158,216 A | 6/1979 | Bigelow |
| 4,242,676 A | 12/1980 | Piguet et al. |
| 4,246,452 A | 1/1981 | Chandler |
| 4,264,903 A | 4/1981 | Bigelow |
| 4,266,144 A | 5/1981 | Bristol |
| 4,293,734 A | 10/1981 | Pepper, Jr. |
| D264,969 S | 6/1982 | McGourty |
| 4,338,502 A | 7/1982 | Hashimoto et al. |
| 4,380,007 A | 4/1983 | Steinegger |
| 4,380,040 A | 4/1983 | Posset |
| 4,394,649 A | 7/1983 | Suchoff et al. |
| 4,475,008 A | 10/1984 | Doi et al. |
| 4,570,149 A | 2/1986 | Thornburg et al. |
| 4,583,161 A | 4/1986 | Gunderson et al. |
| 4,587,378 A | 5/1986 | Moore |
| 4,604,786 A | 8/1986 | Howie, Jr. |
| 4,613,736 A | 9/1986 | Shichijo et al. |
| 4,644,100 A | 2/1987 | Brenner et al. |
| 4,719,524 A | 1/1988 | Morishima et al. |
| 4,734,034 A | 3/1988 | Maness et al. |
| 4,736,191 A | 4/1988 | Matzke et al. |
| 4,739,191 A | 4/1988 | Puar |
| 4,739,299 A | 4/1988 | Eventoff et al. |
| 4,752,655 A | 6/1988 | Tajiri et al. |
| 4,755,765 A | 7/1988 | Ferland |
| 4,764,717 A | 8/1988 | Tucker et al. |
| 4,771,139 A | 9/1988 | DeSmet |
| 4,798,919 A | 1/1989 | Miessler et al. |
| 4,810,992 A | 3/1989 | Eventoff |
| 4,822,957 A | 4/1989 | Talmage, Jr. et al. |
| 4,831,359 A | 5/1989 | Newell |
| 4,849,852 A | 7/1989 | Mullins |
| 4,856,993 A | 8/1989 | Maness et al. |
| 4,860,768 A | 8/1989 | Hon et al. |
| 4,866,602 A | 9/1989 | Hall |
| 4,876,524 A | 10/1989 | Jenkins |
| 4,897,511 A | 1/1990 | Itaya et al. |
| 4,914,624 A | 4/1990 | Dunthorn |
| 4,917,516 A | 4/1990 | Retter |
| 4,943,889 A | 7/1990 | Ohmatoi |
| 4,951,036 A | 8/1990 | Grueter et al. |
| 4,954,823 A | 9/1990 | Binstead |
| 4,976,435 A | 12/1990 | Shatford et al. |
| 4,990,900 A | 2/1991 | Kikuchi |
| 5,008,497 A | 4/1991 | Asher |
| 5,036,321 A | 7/1991 | Leach et al. |
| 5,053,757 A | 10/1991 | Meadows |
| 5,086,870 A | 2/1992 | Bolduc |
| 5,125,077 A | 6/1992 | Hall |
| 5,159,159 A | 10/1992 | Asher |
| 5,179,648 A | 1/1993 | Hauck |
| 5,186,646 A | 2/1993 | Pederson |
| 5,192,082 A | 3/1993 | Inoue et al. |
| 5,193,669 A | 3/1993 | Demeo et al. |
| 5,231,326 A | 7/1993 | Echols |
| 5,237,311 A | 8/1993 | Mailey et al. |
| 5,278,362 A | 1/1994 | Ohashi |
| 5,305,017 A | 4/1994 | Gerpheide |
| 5,313,027 A | 5/1994 | Inoue et al. |
| D349,280 S | 8/1994 | Kaneko |
| 5,339,213 A | 8/1994 | O'Callaghan |
| 5,367,199 A | 11/1994 | Lefkowitz et al. |
| 5,374,787 A | 12/1994 | Miller et al. |
| 5,379,057 A | 1/1995 | Clough et al. |
| 5,404,152 A | 4/1995 | Nagai |
| 5,408,621 A | 4/1995 | Ben-Arie |
| 5,414,445 A | 5/1995 | Kaneko et al. |
| 5,416,498 A | 5/1995 | Grant |
| 5,424,756 A | 6/1995 | Ho et al. |
| 5,432,531 A | 7/1995 | Calder et al. |
| 5,438,331 A | 8/1995 | Gilligan et al. |
| D362,431 S | 9/1995 | Kaneko et al. |
| 5,450,075 A | 9/1995 | Waddington |
| 5,453,761 A | 9/1995 | Tanaka |
| 5,473,343 A | 12/1995 | Kimmich et al. |
| 5,473,344 A | 12/1995 | Bacon et al. |
| 5,479,192 A | 12/1995 | Carroll, Jr. et al. |
| 5,483,261 A | 1/1996 | Yasutake |
| 5,488,204 A | 1/1996 | Mead et al. |
| 5,494,157 A | 2/1996 | Golenz et al. |
| 5,495,566 A | 2/1996 | Kwatinetz |
| 5,508,703 A | 4/1996 | Okamura et al. |
| 5,508,717 A | 4/1996 | Miller |
| 5,543,588 A | 8/1996 | Bisset et al. |
| 5,543,591 A | 8/1996 | Gillespie et al. |
| 5,555,004 A | 9/1996 | Ono et al. |
| 5,559,301 A | 9/1996 | Bryan, Jr. et al. |
| 5,559,943 A | 9/1996 | Cyr et al. |
| 5,561,445 A | 10/1996 | Miwa et al. |
| 5,564,112 A | 10/1996 | Hayes et al. |
| 5,565,887 A | 10/1996 | McCambridge et al. |
| 5,578,817 A | 11/1996 | Bidiville et al. |
| 5,581,670 A | 12/1996 | Bier et al. |
| 5,585,823 A | 12/1996 | Duchon et al. |
| 5,589,856 A | 12/1996 | Stein et al. |
| 5,589,893 A | 12/1996 | Gaughan et al. |
| 5,596,347 A | 1/1997 | Robertson et al. |
| 5,596,697 A | 1/1997 | Foster et al. |
| 5,598,183 A | 1/1997 | Robertson et al. |
| 5,611,040 A | 3/1997 | Brewer et al. |
| 5,611,060 A | 3/1997 | Belfiore et al. |
| 5,613,137 A | 3/1997 | Bertram et al. |
| 5,617,114 A | 4/1997 | Bier et al. |
| 5,627,531 A | 5/1997 | Posso et al. |
| 5,632,679 A | 5/1997 | Tremmel |
| 5,640,258 A | 6/1997 | Kurashima et al. |
| 5,648,642 A | 7/1997 | Miller et al. |
| D382,550 S | 8/1997 | Kaneko et al. |
| 5,657,012 A | 8/1997 | Tait |
| 5,661,632 A | 8/1997 | Register |
| D385,542 S | 10/1997 | Kaneko et al. |
| 5,675,362 A | 10/1997 | Clough et al. |
| 5,689,285 A | 11/1997 | Asher |
| 5,721,849 A | 2/1998 | Amro |
| 5,726,687 A | 3/1998 | Belfiore et al. |
| 5,729,219 A | 3/1998 | Armstrong et al. |
| 5,730,165 A | 3/1998 | Philipp |
| 5,748,185 A | 5/1998 | Stephan et al. |
| 5,751,274 A | 5/1998 | Davis |
| 5,754,890 A | 5/1998 | Holmdahl et al. |
| 5,764,066 A | 6/1998 | Novak et al. |
| 5,777,605 A | 7/1998 | Yoshinobu et al. |
| 5,786,818 A | 7/1998 | Brewer et al. |
| 5,790,769 A | 8/1998 | Buxton et al. |
| 5,798,752 A | 8/1998 | Buxton et al. |
| 5,805,144 A | 9/1998 | Scholder et al. |
| 5,808,602 A | 9/1998 | Sellers |
| 5,812,239 A | 9/1998 | Eger |
| 5,812,498 A | 9/1998 | Térés |
| 5,815,141 A | 9/1998 | Phares |
| 5,825,351 A | 10/1998 | Tam |
| 5,825,352 A | 10/1998 | Bisset et al. |
| 5,825,353 A | 10/1998 | Will |
| 5,828,364 A | 10/1998 | Siddiqui |
| 5,835,079 A | 11/1998 | Shieh |
| 5,838,304 A | 11/1998 | Hall |
| 5,841,078 A | 11/1998 | Miller et al. |
| 5,841,423 A | 11/1998 | Carroll, Jr. et al. |
| D402,281 S | 12/1998 | Ledbetter et al. |
| 5,850,213 A | 12/1998 | Imai et al. |
| 5,856,645 A | 1/1999 | Norton |
| 5,856,822 A | 1/1999 | Du et al. |

(56) References Cited

U.S. PATENT DOCUMENTS

| | | |
|---|---|---|
| 5,859,629 A | 1/1999 | Tognazzini |
| 5,861,875 A | 1/1999 | Gerpheide |
| 5,869,791 A | 2/1999 | Young |
| 5,875,311 A | 2/1999 | Bertram et al. |
| 5,880,411 A | 3/1999 | Gillespie et al. |
| 5,883,619 A | 3/1999 | Ho et al. |
| 5,889,236 A | 3/1999 | Gillespie et al. |
| 5,889,511 A | 3/1999 | Ong et al. |
| 5,894,117 A | 4/1999 | Kamishima |
| 5,903,229 A | 5/1999 | Kishi |
| 5,907,152 A | 5/1999 | Dandliker et al. |
| 5,907,318 A | 5/1999 | Medina |
| 5,909,211 A | 6/1999 | Combs et al. |
| 5,910,802 A | 6/1999 | Shields et al. |
| 5,914,706 A | 6/1999 | Kono |
| 5,923,388 A | 7/1999 | Kurashima et al. |
| D412,940 S | 8/1999 | Kato et al. |
| 5,933,102 A | 8/1999 | Miller et al. |
| 5,933,141 A | 8/1999 | Smith |
| 5,936,619 A | 8/1999 | Nagasaki et al. |
| 5,943,044 A | 8/1999 | Martinelli et al. |
| 5,953,000 A | 9/1999 | Weirich |
| 5,956,019 A | 9/1999 | Bang et al. |
| 5,959,610 A | 9/1999 | Silfvast |
| 5,959,611 A | 9/1999 | Smailagic et al. |
| 5,964,661 A | 10/1999 | Dodge |
| 5,973,668 A | 10/1999 | Watanabe |
| 6,000,000 A | 12/1999 | Hawkins et al. |
| 6,002,093 A | 12/1999 | Hrehor et al. |
| 6,002,389 A | 12/1999 | Kasser et al. |
| 6,005,299 A | 12/1999 | Hengst |
| 6,025,832 A | 2/2000 | Sudo et al. |
| 6,031,518 A | 2/2000 | Adams et al. |
| 6,034,672 A | 3/2000 | Gaultier et al. |
| 6,057,829 A | 5/2000 | Silfvast |
| 6,075,533 A | 6/2000 | Chang |
| 6,084,574 A | 7/2000 | Bidiville |
| D430,169 S | 8/2000 | Scibora |
| 6,097,372 A | 8/2000 | Suzuki |
| 6,104,790 A | 8/2000 | Narayanaswami |
| 6,122,526 A | 9/2000 | Parulski et al. |
| 6,124,587 A | 9/2000 | Bidiville et al. |
| 6,128,006 A | 10/2000 | Rosenberg et al. |
| 6,131,048 A | 10/2000 | Sudo et al. |
| 6,141,068 A | 10/2000 | Iijima |
| 6,147,856 A | 11/2000 | Karidis |
| 6,157,372 A * | 12/2000 | Blackburn .......... G06F 3/04883 345/157 |
| 6,163,312 A | 12/2000 | Furuya |
| 6,166,721 A | 12/2000 | Kuroiwa et al. |
| 6,179,496 B1 | 1/2001 | Chou |
| 6,181,322 B1 | 1/2001 | Nanavati |
| D437,860 S | 2/2001 | Suzuki et al. |
| 6,188,391 B1 | 2/2001 | Seely et al. |
| 6,188,393 B1 | 2/2001 | Shu |
| 6,191,774 B1 | 2/2001 | Schena et al. |
| 6,198,054 B1 | 3/2001 | Janniere |
| 6,198,473 B1 | 3/2001 | Armstrong |
| 6,211,861 B1 | 4/2001 | Rosenberg et al. |
| 6,219,038 B1 | 4/2001 | Cho |
| 6,222,528 B1 | 4/2001 | Gerpheide et al. |
| D442,592 S | 5/2001 | Ledbetter et al. |
| 6,225,976 B1 | 5/2001 | Yates et al. |
| 6,225,980 B1 | 5/2001 | Weiss et al. |
| 6,226,534 B1 | 5/2001 | Aizawa |
| 6,227,966 B1 | 5/2001 | Yokoi |
| D443,616 S | 6/2001 | Fisher et al. |
| 6,243,078 B1 | 6/2001 | Rosenberg |
| 6,243,080 B1 | 6/2001 | Molne |
| 6,243,646 B1 | 6/2001 | Ozaki et al. |
| 6,248,017 B1 | 6/2001 | Roach |
| 6,254,477 B1 | 7/2001 | Sasaki et al. |
| 6,256,011 B1 | 7/2001 | Culver |
| 6,259,491 B1 | 7/2001 | Ekedahl et al. |
| 6,262,717 B1 | 7/2001 | Donohue et al. |
| 6,262,785 B1 | 7/2001 | Kim |
| 6,266,050 B1 | 7/2001 | Oh et al. |
| 6,285,211 B1 | 9/2001 | Sample et al. |
| D448,810 S | 10/2001 | Goto |
| 6,297,795 B1 | 10/2001 | Kato et al. |
| 6,297,811 B1 | 10/2001 | Kent et al. |
| 6,300,946 B1 | 10/2001 | Lincke et al. |
| 6,307,539 B2 | 10/2001 | Suzuki |
| 6,310,610 B1 | 10/2001 | Beaton et al. |
| D450,713 S | 11/2001 | Masamitsu et al. |
| 6,314,483 B1 | 11/2001 | Goto et al. |
| 6,321,441 B1 | 11/2001 | Davidson et al. |
| 6,323,845 B1 | 11/2001 | Robbins |
| 6,323,846 B1 | 11/2001 | Westerman et al. |
| D452,250 S | 12/2001 | Chan |
| 6,337,678 B1 | 1/2002 | Fish |
| 6,340,800 B1 | 1/2002 | Zhai et al. |
| D454,568 S | 3/2002 | Andre et al. |
| 6,357,887 B1 | 3/2002 | Novak |
| D455,793 S | 4/2002 | Lin |
| 6,373,265 B1 | 4/2002 | Morimoto et al. |
| 6,373,470 B1 | 4/2002 | Andre et al. |
| 6,377,530 B1 | 4/2002 | Burrows |
| 6,396,523 B1 | 5/2002 | Segal et al. |
| 6,424,338 B1 | 7/2002 | Anderson |
| 6,429,846 B2 | 8/2002 | Rosenberg et al. |
| 6,429,852 B1 | 8/2002 | Adams et al. |
| 6,452,514 B1 | 9/2002 | Philipp |
| 6,465,271 B1 | 10/2002 | Ko et al. |
| 6,473,069 B1 | 10/2002 | Gerpheide |
| 6,492,602 B2 | 12/2002 | Asai et al. |
| 6,492,979 B1 | 12/2002 | Kent et al. |
| 6,496,181 B1 | 12/2002 | Bomer et al. |
| 6,497,412 B1 | 12/2002 | Bramm |
| D468,365 S | 1/2003 | Bransky et al. |
| D469,109 S | 1/2003 | Andre et al. |
| D472,245 S | 3/2003 | Andre et al. |
| 6,546,231 B1 | 4/2003 | Someya et al. |
| 6,563,487 B2 | 5/2003 | Martin et al. |
| 6,587,091 B2 | 7/2003 | Serpa |
| 6,606,244 B1 | 8/2003 | Liu et al. |
| 6,618,909 B1 | 9/2003 | Yang |
| 6,636,197 B1 | 10/2003 | Goldenberg et al. |
| 6,639,584 B1 | 10/2003 | Li |
| 6,640,250 B1 | 10/2003 | Chang et al. |
| 6,650,975 B2 | 11/2003 | Ruffner |
| D483,809 S | 12/2003 | Lim |
| 6,658,773 B2 | 12/2003 | Rohne et al. |
| 6,664,951 B1 | 12/2003 | Fujii et al. |
| 6,677,927 B1 | 1/2004 | Bruck et al. |
| 6,678,891 B1 | 1/2004 | Wilcox et al. |
| 6,686,904 B1 | 2/2004 | Sherman et al. |
| 6,686,906 B2 | 2/2004 | Salminen et al. |
| 6,690,387 B2 | 2/2004 | Zimmerman et al. |
| 6,703,550 B2 | 3/2004 | Chu |
| 6,724,817 B1 | 4/2004 | Simpson et al. |
| 6,727,889 B2 | 4/2004 | Shaw |
| D489,731 S | 5/2004 | Huang |
| 6,738,045 B2 | 5/2004 | Hinckley et al. |
| 6,750,803 B2 | 6/2004 | Yates et al. |
| 6,781,576 B2 | 8/2004 | Tamura |
| 6,784,384 B2 | 8/2004 | Park et al. |
| 6,788,288 B2 | 9/2004 | Ano |
| 6,791,533 B2 | 9/2004 | Su |
| 6,795,057 B2 | 9/2004 | Gordon |
| D497,618 S | 10/2004 | Andre et al. |
| 6,810,271 B1 | 10/2004 | Wood et al. |
| 6,822,640 B2 | 11/2004 | Derocher |
| 6,834,975 B2 | 12/2004 | Chu-Chia et al. |
| 6,844,872 B1 | 1/2005 | Farag et al. |
| 6,855,899 B2 | 2/2005 | Sotome |
| 6,865,718 B2 | 3/2005 | Levi Montalcini |
| 6,886,842 B2 | 5/2005 | Vey et al. |
| 6,894,916 B2 | 5/2005 | Reohr et al. |
| D506,476 S | 6/2005 | Andre et al. |
| 6,922,189 B2 | 7/2005 | Fujiyoshi |
| 6,930,494 B2 | 8/2005 | Tesdahl et al. |
| 6,958,614 B2 | 10/2005 | Morimoto |
| 6,977,808 B2 | 12/2005 | Lam et al. |

(56) References Cited

U.S. PATENT DOCUMENTS

| | | |
|---|---|---|
| 6,978,127 B1 | 12/2005 | Bulthuis et al. |
| 6,985,137 B2 | 1/2006 | Kaikuranta |
| 7,006,077 B1 | 2/2006 | Uusimäki |
| 7,015,894 B2 | 3/2006 | Morohoshi |
| 7,019,225 B2 | 3/2006 | Matsumoto et al. |
| 7,046,230 B2 | 5/2006 | Zadesky et al. |
| 7,050,292 B2 | 5/2006 | Shimura et al. |
| 7,069,044 B2 | 6/2006 | Okada et al. |
| 7,078,633 B2 | 7/2006 | Ihalainen |
| 7,084,856 B2 | 8/2006 | Huppi |
| 7,113,196 B2 | 9/2006 | Kerr |
| 7,117,136 B1 | 10/2006 | Rosedale |
| 7,119,792 B1 | 10/2006 | Andre et al. |
| 7,184,064 B2 | 2/2007 | Zimmerman et al. |
| 7,215,319 B2 | 5/2007 | Kamijo et al. |
| 7,233,318 B1 | 6/2007 | Farag et al. |
| 7,236,154 B1 | 6/2007 | Kerr et al. |
| 7,236,159 B1 | 6/2007 | Siversson |
| 7,253,643 B1 | 8/2007 | Seguine |
| 7,279,647 B2 | 10/2007 | Philipp |
| 7,288,732 B2 | 10/2007 | Hashida |
| 7,297,883 B2 | 11/2007 | Rochon et al. |
| 7,310,089 B2 | 12/2007 | Baker et al. |
| 7,312,785 B2 | 12/2007 | Tsuk et al. |
| 7,321,103 B2 | 1/2008 | Nakanishi et al. |
| 7,333,092 B2 | 2/2008 | Zadesky et al. |
| 7,348,898 B2 | 3/2008 | Ono |
| 7,382,139 B2 | 6/2008 | Mackey |
| 7,394,038 B2 | 7/2008 | Chang |
| 7,395,081 B2 | 7/2008 | Bonnelykke Kristensen et al. |
| 7,397,467 B2 | 7/2008 | Park et al. |
| 7,439,963 B2 | 10/2008 | Geaghan et al. |
| 7,466,307 B2 * | 12/2008 | Trent, Jr. ............ G06F 3/03547 345/156 |
| 7,479,949 B2 | 1/2009 | Jobs et al. |
| 7,486,323 B2 | 2/2009 | Lee et al. |
| 7,502,016 B2 | 3/2009 | Trent, Jr. et al. |
| 7,503,193 B2 | 3/2009 | Schoene et al. |
| 7,593,782 B2 | 9/2009 | Jobs et al. |
| 7,645,955 B2 | 1/2010 | Huang et al. |
| 7,663,607 B2 | 2/2010 | Hotelling et al. |
| 7,671,837 B2 | 3/2010 | Forsblad et al. |
| 7,708,051 B2 | 5/2010 | Katsumi et al. |
| 7,772,507 B2 | 8/2010 | Orr et al. |
| 8,479,122 B2 | 7/2013 | Hotelling et al. |
| 2001/0011991 A1 | 8/2001 | Wang et al. |
| 2001/0011993 A1 | 8/2001 | Saarinen |
| 2001/0033270 A1 | 10/2001 | Osawa et al. |
| 2001/0043545 A1 | 11/2001 | Aratani |
| 2001/0050673 A1 | 12/2001 | Davenport |
| 2001/0051046 A1 | 12/2001 | Watanabe et al. |
| 2002/0000978 A1 | 1/2002 | Gerpheide |
| 2002/0011993 A1 | 1/2002 | Lui et al. |
| 2002/0027547 A1 | 3/2002 | Kamijo |
| 2002/0030665 A1 | 3/2002 | Ano |
| 2002/0033848 A1 | 3/2002 | Sciammarella et al. |
| 2002/0039493 A1 | 4/2002 | Tanaka |
| 2002/0045960 A1 | 4/2002 | Phillips et al. |
| 2002/0071550 A1 | 6/2002 | Pletikosa |
| 2002/0089545 A1 | 7/2002 | Levi Montalcini |
| 2002/0103796 A1 | 8/2002 | Hartley |
| 2002/0118131 A1 | 8/2002 | Yates et al. |
| 2002/0118169 A1 | 8/2002 | Hinckley et al. |
| 2002/0145594 A1 | 10/2002 | Derocher |
| 2002/0154090 A1 | 10/2002 | Lin |
| 2002/0158844 A1 | 10/2002 | McLoone et al. |
| 2002/0164156 A1 | 11/2002 | Bilbrey |
| 2002/0168947 A1 | 11/2002 | Lemley |
| 2002/0180701 A1 | 12/2002 | Hayama et al. |
| 2002/0196239 A1 | 12/2002 | Lee |
| 2003/0002246 A1 | 1/2003 | Kerr |
| 2003/0025679 A1 | 2/2003 | Taylor et al. |
| 2003/0028346 A1 | 2/2003 | Sinclair et al. |
| 2003/0043121 A1 | 3/2003 | Chen |
| 2003/0043174 A1 | 3/2003 | Hinckley et al. |
| 2003/0050092 A1 | 3/2003 | Yun |
| 2003/0076301 A1 | 4/2003 | Tsuk et al. |
| 2003/0076303 A1 | 4/2003 | Huppi |
| 2003/0076306 A1 | 4/2003 | Zadesky et al. |
| 2003/0091377 A1 | 5/2003 | Hsu et al. |
| 2003/0095095 A1 | 5/2003 | Pihlaja |
| 2003/0095096 A1 | 5/2003 | Robbin et al. |
| 2003/0098851 A1 | 5/2003 | Brink |
| 2003/0103043 A1 | 6/2003 | Mulligan et al. |
| 2003/0122792 A1 | 7/2003 | Yamamoto et al. |
| 2003/0135292 A1 | 7/2003 | Husgafvel et al. |
| 2003/0142081 A1 | 7/2003 | Iizuka et al. |
| 2003/0184517 A1 | 10/2003 | Senzui et al. |
| 2003/0197740 A1 | 10/2003 | Reponen |
| 2003/0206202 A1 | 11/2003 | Moriya |
| 2003/0210537 A1 | 11/2003 | Engelmann |
| 2003/0224831 A1 | 12/2003 | Engstrom et al. |
| 2004/0027341 A1 | 2/2004 | Derocher |
| 2004/0074756 A1 | 4/2004 | Kawakami et al. |
| 2004/0080682 A1 | 4/2004 | Dalton |
| 2004/0109357 A1 | 6/2004 | Cernea et al. |
| 2004/0150619 A1 | 8/2004 | Baudisch et al. |
| 2004/0156192 A1 | 8/2004 | Kerr et al. |
| 2004/0178997 A1 | 9/2004 | Gillespie et al. |
| 2004/0200699 A1 | 10/2004 | Matsumoto et al. |
| 2004/0215986 A1 | 10/2004 | Shakkarwar |
| 2004/0224638 A1 | 11/2004 | Fadell et al. |
| 2004/0239622 A1 | 12/2004 | Proctor et al. |
| 2004/0252109 A1 | 12/2004 | Trent, Jr. et al. |
| 2004/0252867 A1 | 12/2004 | Lan et al. |
| 2004/0253989 A1 | 12/2004 | Tupler et al. |
| 2004/0263388 A1 | 12/2004 | Krumm et al. |
| 2004/0267874 A1 | 12/2004 | Westberg et al. |
| 2005/0012644 A1 | 1/2005 | Hurst et al. |
| 2005/0017957 A1 | 1/2005 | Yi |
| 2005/0024341 A1 | 2/2005 | Gillespie et al. |
| 2005/0030048 A1 | 2/2005 | Bolender et al. |
| 2005/0052425 A1 | 3/2005 | Zadesky et al. |
| 2005/0052426 A1 | 3/2005 | Hagermoser et al. |
| 2005/0052429 A1 | 3/2005 | Philipp |
| 2005/0068304 A1 | 3/2005 | Lewis et al. |
| 2005/0083299 A1 | 4/2005 | Nagasaka |
| 2005/0083307 A1 | 4/2005 | Aufderheide |
| 2005/0090288 A1 | 4/2005 | Stohr et al. |
| 2005/0104867 A1 | 5/2005 | Westerman et al. |
| 2005/0110768 A1 | 5/2005 | Marriott et al. |
| 2005/0129199 A1 | 6/2005 | Abe |
| 2005/0139460 A1 | 6/2005 | Hosaka |
| 2005/0140657 A1 | 6/2005 | Park et al. |
| 2005/0143124 A1 | 6/2005 | Kennedy et al. |
| 2005/0156881 A1 | 7/2005 | Trent et al. |
| 2005/0156898 A1 * | 7/2005 | Yoshioka ............... G06F 3/0338 345/169 |
| 2005/0162402 A1 | 7/2005 | Watanachote |
| 2005/0204309 A1 | 9/2005 | Szeto |
| 2005/0237308 A1 | 10/2005 | Autio et al. |
| 2006/0026521 A1 | 2/2006 | Hotelling et al. |
| 2006/0026535 A1 | 2/2006 | Hotelling et al. |
| 2006/0026536 A1 | 2/2006 | Hotelling et al. |
| 2006/0032680 A1 | 2/2006 | Elias et al. |
| 2006/0038791 A1 | 2/2006 | Mackey |
| 2006/0066582 A1 | 3/2006 | Lyon et al. |
| 2006/0066588 A1 | 3/2006 | Lyon et al. |
| 2006/0095848 A1 | 5/2006 | Naik |
| 2006/0097991 A1 | 5/2006 | Hotelling et al. |
| 2006/0131156 A1 | 6/2006 | Voelckers |
| 2006/0143574 A1 | 6/2006 | Ito et al. |
| 2006/0174568 A1 | 8/2006 | Kinoshita et al. |
| 2006/0181517 A1 | 8/2006 | Zadesky et al. |
| 2006/0197750 A1 | 9/2006 | Kerr et al. |
| 2006/0197753 A1 | 9/2006 | Hotelling |
| 2006/0232557 A1 | 10/2006 | Fallot-Burghardt |
| 2006/0236262 A1 | 10/2006 | Bathiche et al. |
| 2006/0250377 A1 | 11/2006 | Zadesky et al. |
| 2006/0274042 A1 | 12/2006 | Krah et al. |
| 2006/0274905 A1 | 12/2006 | Lindahl et al. |
| 2006/0279896 A1 | 12/2006 | Bruwer |
| 2006/0284836 A1 | 12/2006 | Philipp |
| 2007/0013671 A1 | 1/2007 | Zadesky et al. |

(56) References Cited

U.S. PATENT DOCUMENTS

| | | |
|---|---|---|
| 2007/0018970 A1 | 1/2007 | Tabasso et al. |
| 2007/0052044 A1 | 3/2007 | Forsblad et al. |
| 2007/0052691 A1 | 3/2007 | Zadesky et al. |
| 2007/0080936 A1 | 4/2007 | Tsuk et al. |
| 2007/0080938 A1 | 4/2007 | Robbin et al. |
| 2007/0080952 A1 | 4/2007 | Lynch et al. |
| 2007/0083822 A1 | 4/2007 | Robbin et al. |
| 2007/0085841 A1 | 4/2007 | Tsuk et al. |
| 2007/0097086 A1 | 5/2007 | Battles et al. |
| 2007/0120834 A1 | 5/2007 | Boillot |
| 2007/0126696 A1 | 6/2007 | Boillot |
| 2007/0152975 A1 | 7/2007 | Ogihara |
| 2007/0152977 A1 | 7/2007 | Ng et al. |
| 2007/0152983 A1 | 7/2007 | McKillop et al. |
| 2007/0155434 A1 | 7/2007 | Jobs et al. |
| 2007/0157089 A1 | 7/2007 | Van Os et al. |
| 2007/0236470 A1* | 10/2007 | Abanami ............ G06F 3/03547 345/173 |
| 2007/0242057 A1 | 10/2007 | Zadesky et al. |
| 2007/0247421 A1 | 10/2007 | Orsley et al. |
| 2007/0247443 A1 | 10/2007 | Philipp |
| 2007/0271516 A1 | 11/2007 | Carmichael |
| 2007/0273671 A1 | 11/2007 | Zadesky et al. |
| 2007/0276525 A1 | 11/2007 | Zadesky et al. |
| 2007/0279394 A1 | 12/2007 | Lampell |
| 2007/0285404 A1 | 12/2007 | Rimon et al. |
| 2007/0290990 A1 | 12/2007 | Robbin et al. |
| 2007/0291016 A1 | 12/2007 | Philipp |
| 2007/0296709 A1 | 12/2007 | GuangHai |
| 2008/0006453 A1 | 1/2008 | Hotelling et al. |
| 2008/0006454 A1 | 1/2008 | Hotelling |
| 2008/0007533 A1 | 1/2008 | Hotelling et al. |
| 2008/0007539 A1 | 1/2008 | Hotelling et al. |
| 2008/0012837 A1 | 1/2008 | Marriott et al. |
| 2008/0018615 A1 | 1/2008 | Zadesky et al. |
| 2008/0018616 A1 | 1/2008 | Lampell et al. |
| 2008/0018617 A1 | 1/2008 | Ng et al. |
| 2008/0284742 A1 | 1/2008 | Prest |
| 2008/0036473 A1 | 2/2008 | Jansson |
| 2008/0036734 A1 | 2/2008 | Forsblad et al. |
| 2008/0060925 A1 | 3/2008 | Weber et al. |
| 2008/0069412 A1 | 3/2008 | Champagne et al. |
| 2008/0079699 A1 | 4/2008 | Mackey |
| 2008/0087476 A1 | 4/2008 | Prest |
| 2008/0088582 A1 | 4/2008 | Prest |
| 2008/0088596 A1 | 4/2008 | Prest |
| 2008/0088597 A1 | 4/2008 | Prest |
| 2008/0088600 A1 | 4/2008 | Prest |
| 2008/0094352 A1 | 4/2008 | Tsuk et al. |
| 2008/0098330 A1 | 4/2008 | Tsuk et al. |
| 2008/0110739 A1 | 5/2008 | Peng et al. |
| 2008/0111795 A1 | 5/2008 | Bollinger |
| 2008/0143681 A1 | 6/2008 | XiaoPing |
| 2008/0158145 A1 | 7/2008 | Westerman |
| 2008/0165131 A1* | 7/2008 | Kim ............ G06F 3/0338 345/168 |
| 2008/0165141 A1 | 7/2008 | Christie |
| 2008/0165158 A1 | 7/2008 | Hotelling et al. |
| 2008/0196945 A1 | 8/2008 | Konstas |
| 2008/0202824 A1 | 8/2008 | Philipp et al. |
| 2008/0209442 A1 | 8/2008 | Setlur et al. |
| 2008/0246723 A1* | 10/2008 | Baumbach .......... G06F 3/03547 345/156 |
| 2008/0264767 A1 | 10/2008 | Chen et al. |
| 2008/0277171 A1* | 11/2008 | Wright ................ G06F 1/3203 178/18.06 |
| 2008/0280651 A1 | 11/2008 | Duarte |
| 2008/0293274 A1 | 11/2008 | Milan |
| 2009/0008161 A1* | 1/2009 | Jones ................ G06F 3/044 178/18.06 |
| 2009/0021267 A1 | 1/2009 | Golovchenko et al. |
| 2009/0026558 A1 | 1/2009 | Bauer et al. |
| 2009/0033635 A1 | 2/2009 | Wai |
| 2009/0036176 A1 | 2/2009 | Ure |
| 2009/0058687 A1 | 3/2009 | Rothkopf et al. |
| 2009/0058801 A1 | 3/2009 | Bull |
| 2009/0058802 A1 | 3/2009 | Orsley et al. |
| 2009/0073130 A1 | 3/2009 | Weber et al. |
| 2009/0078551 A1 | 3/2009 | Kang |
| 2009/0109181 A1 | 4/2009 | Hui et al. |
| 2009/0141046 A1 | 6/2009 | Rathnam et al. |
| 2009/0160771 A1 | 6/2009 | Hinckley et al. |
| 2009/0179854 A1 | 7/2009 | Weber et al. |
| 2009/0197059 A1 | 8/2009 | Weber et al. |
| 2009/0273573 A1 | 11/2009 | Hotelling |
| 2010/0058251 A1 | 3/2010 | Rottler et al. |
| 2010/0060568 A1 | 3/2010 | Fisher et al. |
| 2010/0073319 A1 | 3/2010 | Lyon et al. |
| 2010/0149127 A1 | 6/2010 | Fisher et al. |
| 2010/0289759 A1 | 11/2010 | Fisher et al. |
| 2010/0313409 A1 | 12/2010 | Weber et al. |
| 2011/0005845 A1 | 1/2011 | Hotelling et al. |
| 2012/0044194 A1* | 2/2012 | Peng .................. G06F 3/044 345/174 |

FOREIGN PATENT DOCUMENTS

| | | |
|---|---|---|
| CN | 1499356 | 5/2004 |
| CN | 1659506 | 8/2005 |
| DE | 3615742 | 11/1987 |
| DE | 19722636 | 12/1998 |
| DE | 10022537 | 11/2000 |
| DE | 20019074 U1 | 2/2001 |
| DE | 10 2004 043 663 | 4/2006 |
| EP | 0178157 | 4/1986 |
| EP | 0419145 A1 | 3/1991 |
| EP | 0 498 540 | 8/1992 |
| EP | 0 521 683 | 1/1993 |
| EP | 0 674 288 | 9/1995 |
| EP | 0 731 407 | 9/1996 |
| EP | 0 551 778 B1 | 1/1997 |
| EP | 0 880 091 A2 | 11/1998 |
| EP | 1 026 713 | 8/2000 |
| EP | 1 081 922 A2 | 3/2001 |
| EP | 1 098 241 A2 | 5/2001 |
| EP | 1 133 057 | 9/2001 |
| EP | 1 162 826 A2 | 12/2001 |
| EP | 1 168 396 | 1/2002 |
| EP | 1 205 836 A2 | 5/2002 |
| EP | 1 244 053 | 9/2002 |
| EP | 1 251 455 A2 | 10/2002 |
| EP | 1263193 | 12/2002 |
| EP | 1347481 | 9/2003 |
| EP | 1376326 | 1/2004 |
| EP | 1 467 392 | 10/2004 |
| EP | 1 482 401 | 12/2004 |
| EP | 1 496 467 | 1/2005 |
| EP | 1 517 228 | 3/2005 |
| EP | 1 542 437 A2 | 6/2005 |
| EP | 1 589 407 | 10/2005 |
| EP | 1 784 058 A2 | 5/2007 |
| EP | 1 841 188 | 10/2007 |
| EP | 1850218 | 10/2007 |
| EP | 1 876 711 | 1/2008 |
| FR | 2 686 440 | 7/1993 |
| GB | 2015167 | 9/1979 |
| GB | 2072389 | 9/1981 |
| GB | 2315186 | 1/1998 |
| GB | 2333215 | 7/1999 |
| GB | 2391060 | 1/2004 |
| GB | 2 402 105 | 12/2004 |
| JP | 57-95722 | 6/1982 |
| JP | 57-97626 | 6/1982 |
| JP | 61-117619 | 6/1986 |
| JP | 61-124009 | 6/1986 |
| JP | 63-20411 | 1/1988 |
| JP | 63-106826 | 5/1988 |
| JP | 63-181022 | 7/1988 |
| JP | 63-298518 | 12/1988 |
| JP | 03-57617 | 6/1991 |
| JP | 3-192418 | 8/1991 |
| JP | 04-32920 | 2/1992 |
| JP | 4-205408 | 7/1992 |
| JP | 5-041135 | 2/1993 |

(56) References Cited

FOREIGN PATENT DOCUMENTS

| | | |
|---|---|---|
| JP | 5-080938 | 4/1993 |
| JP | 5-101741 | 4/1993 |
| JP | 5-36623 | 5/1993 |
| JP | 5-189110 | 7/1993 |
| JP | 5-205565 | 8/1993 |
| JP | 5-211021 | 8/1993 |
| JP | 5-217464 | 8/1993 |
| JP | 5-233141 | 9/1993 |
| JP | 5-262276 | 10/1993 |
| JP | 5-265656 | 10/1993 |
| JP | 5-274956 | 10/1993 |
| JP | 5-289811 | 11/1993 |
| JP | 5-298955 | 11/1993 |
| JP | 5-325723 | 12/1993 |
| JP | 6-20570 | 1/1994 |
| JP | 6-084428 | 3/1994 |
| JP | 6-089636 | 3/1994 |
| JP | 6-96639 | 4/1994 |
| JP | 6-111695 | 4/1994 |
| JP | 6-139879 | 5/1994 |
| JP | 6-187078 | 7/1994 |
| JP | 6-208433 | 7/1994 |
| JP | 6-267382 | 9/1994 |
| JP | 6-283993 | 10/1994 |
| JP | 6-333459 | 12/1994 |
| JP | 7-107574 | 4/1995 |
| JP | 7-41882 | 7/1995 |
| JP | 7-201249 | 8/1995 |
| JP | 7-201256 | 8/1995 |
| JP | 7-253838 | 10/1995 |
| JP | 7-261899 | 10/1995 |
| JP | 7-261922 | 10/1995 |
| JP | 7-296670 | 11/1995 |
| JP | 7-319001 | 12/1995 |
| JP | 8-016292 | 1/1996 |
| JP | 8-115158 | 5/1996 |
| JP | 8-203387 | 8/1996 |
| JP | 8-293226 | 11/1996 |
| JP | 8-298045 | 11/1996 |
| JP | 8-299541 | 11/1996 |
| JP | 8-316664 | 11/1996 |
| JP | 9-044289 | 2/1997 |
| JP | 9-069023 | 3/1997 |
| JP | 9-128148 | 5/1997 |
| JP | 9-134248 | 5/1997 |
| JP | 9-218747 | 8/1997 |
| JP | 9-230993 | 9/1997 |
| JP | 9-231858 | 9/1997 |
| JP | 9-233161 | 9/1997 |
| JP | 9-251347 | 9/1997 |
| JP | 9-258895 | 10/1997 |
| JP | 9-288926 | 11/1997 |
| JP | 9-512979 | 12/1997 |
| JP | 10-63467 | 3/1998 |
| JP | 10-74127 | 3/1998 |
| JP | 10-074429 | 3/1998 |
| JP | 10-198507 | 7/1998 |
| JP | 10-227878 | 8/1998 |
| JP | 10-240693 | 9/1998 |
| JP | 10-320322 | 12/1998 |
| JP | 10-326149 | 12/1998 |
| JP | 11-24834 | 1/1999 |
| JP | 11-184607 | 7/1999 |
| JP | 11-194863 | 7/1999 |
| JP | 11-194872 | 7/1999 |
| JP | 11-194882 | 7/1999 |
| JP | 11-194883 | 7/1999 |
| JP | 11-194891 | 7/1999 |
| JP | 11-195353 | 7/1999 |
| JP | 11-203045 | 7/1999 |
| JP | 11-212725 | 8/1999 |
| JP | 11-272378 | 10/1999 |
| JP | 11-338628 | 12/1999 |
| JP | 2000-163031 A | 6/2000 |
| JP | 2000-200147 | 7/2000 |
| JP | 2000-215549 | 8/2000 |
| JP | 2000-267777 | 9/2000 |
| JP | 2000-267786 | 9/2000 |
| JP | 2000-267797 | 9/2000 |
| JP | 2000-353045 | 12/2000 |
| JP | 2001-11769 | 1/2001 |
| JP | 2001-22508 | 1/2001 |
| JP | 2001-184158 | 7/2001 |
| JP | 3085481 | 2/2002 |
| JP | 2002-215311 | 8/2002 |
| JP | 2002-342033 A | 11/2002 |
| JP | 2003-015796 | 1/2003 |
| JP | 2003-060754 | 2/2003 |
| JP | 2003-099198 | 4/2003 |
| JP | 2003-150303 | 5/2003 |
| JP | 2003-517674 | 5/2003 |
| JP | 2003-280799 | 10/2003 |
| JP | 2003-280807 | 10/2003 |
| JP | 2004-362097 | 12/2004 |
| JP | 2005-251218 | 9/2005 |
| JP | 2005-285140 | 10/2005 |
| JP | 2005-293606 | 10/2005 |
| JP | 2006-004453 | 1/2006 |
| JP | 2006-178962 | 7/2006 |
| JP | 3852854 | 12/2006 |
| JP | 2007-123473 | 5/2007 |
| KR | 1998-71394 | 10/1998 |
| KR | 1999-50198 | 7/1999 |
| KR | 2000-0008579 | 2/2000 |
| KR | 2001-0052016 | 6/2001 |
| KR | 2001-108361 | 12/2001 |
| KR | 2002-65059 | 8/2002 |
| KR | 10-2006-0021678 | 3/2006 |
| TW | 431607 | 4/2001 |
| TW | 00470193 | 12/2001 |
| TW | 547716 | 8/2003 |
| TW | I220491 | 8/2004 |
| WO | WO-94/17494 | 8/1994 |
| WO | WO-95/00897 A1 | 1/1995 |
| WO | WO-96/27968 | 9/1996 |
| WO | WO 98/14863 | 4/1998 |
| WO | WO-99/49443 | 9/1999 |
| WO | WO-00/79772 | 12/2000 |
| WO | WO-01/02949 | 1/2001 |
| WO | WO-01/44912 | 6/2001 |
| WO | WO-02/08881 | 1/2002 |
| WO | WO-03/044645 | 5/2003 |
| WO | WO 03/044956 | 5/2003 |
| WO | WO-03/025960 | 9/2003 |
| WO | WO 03/088176 | 10/2003 |
| WO | WO 03/090008 | 10/2003 |
| WO | WO-2004/001573 | 12/2003 |
| WO | WO 2004/040606 | 5/2004 |
| WO | WO-2004/091956 | 10/2004 |
| WO | WO-2005/055620 | 6/2005 |
| WO | WO 2005/076117 | 8/2005 |
| WO | WO-2005/114369 | 12/2005 |
| WO | WO 2005/124526 | 12/2005 |
| WO | WO-2006/020305 | 2/2006 |
| WO | WO-2006/021211 A2 | 3/2006 |
| WO | WO 2006/037545 | 4/2006 |
| WO | WO 2006/104745 | 10/2006 |
| WO | WO-2006/135127 | 12/2006 |
| WO | WO 2007/025858 | 3/2007 |
| WO | WO-2007/078477 | 7/2007 |
| WO | WO-2007/084467 | 7/2007 |
| WO | WO-2007/089766 | 8/2007 |
| WO | WO-2008/007372 | 1/2008 |
| WO | WO-2008/045414 | 4/2008 |
| WO | WO-2008/045833 | 4/2008 |

OTHER PUBLICATIONS

Tsuk et al., U.S. Office Action mailed Mar. 31, 2011, directed to U.S. Appl. No. 11/959,918; 9 pages.

Robbin et al., U.S. Office Action mailed Apr. 26, 2011, directed to U.S. Appl. No. 11/838,845; 9 pages.

Zadesky et al., U.S. Office Action mailed Mar. 31, 2011, directed to U.S. Appl. No. 11/882,005; 7 pages.

(56) References Cited

OTHER PUBLICATIONS

Bollinger et al., U.S. Office Action mailed Mar. 21, 2011, directed to U.S. Appl. No. 11/842,724; 22 pages.
McKillop et al., U.S. Office Action mailed Mar. 24, 2011, directed to U.S. Appl. No. 11/591,752; 11 pages.
Zadesky et al., U.S. Office Action mailed Mar. 16, 2011, directed to U.S. Appl. No. 11/882,003; 12 pages.
Rathnam et al., U.S. Office Action mailed Mar. 24, 2011, directed to U.S. Appl. No. 12/205,757; 14 pages.
International Search Report and Written Opinion mailed May 20, 2010, directed to counterpart application No. PCT/US2009/036806; 12 pages.
Ng et al., U.S. Office Action mailed Jun. 22, 2010, directed to U.S. Appl. No. 11/394,493; 14 pages.
Lampell, U.S. Office Action mailed Jun. 4, 2010, directed to U.S. Appl. No. 11/530,807; 15 pages.
Prest et al., U.S. Office Action mailed Jun. 22, 2010, directed to U.S. Appl. No. 11/878,132; 32 pages.
Prest et al., U.S. Office Action mailed Jun. 22, 2010, directed to U.S. Appl. No. 11/882,882; 32 pages.
Prest et al., U.S. Office Action mailed Jun. 23, 2010, directed to U.S. Appl. No. 11/812,384; 29 pages.
Prest et al., U.S. Office Action mailed Jun. 22, 2010, directed to U.S. Appl. No. 11/882,890; 15 pages.
Prest et al., U.S. Office Action mailed Jun. 22, 2010, directed to U.S. Appl. No. 11/812,383; 21 pages.
Prest et al., U.S. Office Action mailed Jun. 23, 2010, directed to U.S. Appl. No. 11/882,889; 13 pages.
Bollinger et al., U.S. Office Action mailed Jun. 25, 2010, directed to U.S. Appl. No. 11/842,724; 22 pages.
Hotelling, U.S. Office mailed Jun. 9, 2010, directed to U.S. Appl. No. 11/482,286; 21 pages.
Elias et al., U.S. Office Action mailed Jun. 11, 2010, directed to U.S. Appl. No. 11/203,692; 17 pages.
Weber et al., U.S. Office Action mailed Jun. 7, 2010, directed to U.S. Appl. No. 11/856,530; 15 pages.
Robbin et al., U.S. Appl. No. 60/387,692 entitled "Method and Apparatus for Use of Rotational User Inputs," filed Jun. 10, 2002.
Robbin et al., U.S. Appl. No. 60/399,806 entitled "Graphical User Interface and Methods of Use Thereof in a Multimedia Player," filed Jul. 30, 2002.
Tsuk et al., U.S. Office Action mailed Oct. 13, 2006, directed to U.S. Appl. No. 10/256,716; 16 pages.
Tsuk et al., U.S. Office Action mailed Aug. 3, 2006, directed to U.S. Appl. No. 10/256,716; 15 pages.
Tsuk et al., U.S. Office Action mailed Jan. 10, 2006, directed to U.S. Appl. No. 10/256,716; 12 pages.
Tsuk et al., U.S. Office Action mailed Jun. 24, 2005, directed to U.S. Appl. No. 10/256,716; 12 pages.
Tsuk et al., U.S. Office Action mailed Sep. 30, 2004, directed to U.S. Appl. No. 10/256,716; 11 pages.
Tsuk et al., U.S. Office Action mailed Jul. 7, 2009, directed to U.S. Appl. No. 11/610,190; 24 pages.
Robbin et al., U.S. Office Action mailed Jan. 18, 2007, directed to U.S. Appl. No. 10/259,159; 18 pages.
Robbin et al., U.S. Office Action mailed Oct. 13, 2006, directed to U.S. Appl. No. 10/259,159; 18 pages.
Robbin et al., U.S. Office Action mailed Aug. 3, 2006, directed to U.S. Appl. No. 10/259,159; 15 pages.
Robbin et al., U.S. Office Action mailed Jan. 11, 2006, directed to U.S. Appl. No. 10/259,159; 15 pages.
Robbin et al., U.S. Office Action mailed Jun. 16, 2005, directed to U.S. Appl. No. 10/259,159; 16 pages.
Robbin et al., U.S. Office Action mailed Sep. 30, 2004, directed to U.S. Appl. No. 10/259,159; 14 pages.
Zadesky et al., U.S. Office Action mailed Jul. 9, 2008, directed to U.S. Appl. No. 10/643,256; 12 pages.
Zadesky et al., U.S. Office Action mailed Dec. 12, 2007, directed to U.S. Appl. No. 10/643,256; 12 pages.
Zadesky et al., U.S. Office Action mailed Jul. 13, 2007, directed to U.S. Appl. No. 10/643,256; 13 pages.
Zadesky et al., U.S. Office Action mailed Mar. 23, 2007, directed to U.S. Appl. No. 10/643,256; 11 pages.
Zadesky et al., U.S. Office Action mailed Oct. 27, 2006, directed to U.S. Appl. No. 10/643,256; 14 pages.
Forsblad et al., U.S. Office Action mailed Jun. 25, 2009, directed to U.S. Appl. No. 11/355,022; 18 pages.
Forsblad et al., U.S. Office Action mailed Jan. 26, 2009, directed to U.S. Appl. No. 11/355,022; 15 pages.
Hotelling et al., U.S. Office Action mailed Jan. 27, 2009, directed to U.S. Appl. No. 11/882,421; 15 pages.
Zadesky et al., U.S. Office Action mailed Aug. 6, 2009, directed to U.S. Appl. No. 11/057,050; 30 pages.
Zadesky et al., U.S. Office Action mailed Feb. 20, 2009, directed to U.S. Appl. No. 11/057,050; 25 pages.
Zadesky et al., U.S. Office Action mailed Dec. 24, 2008, directed to U.S. Appl. No. 11/057,050; 25 pages.
Zadesky et al., U.S. Office Action mailed Nov. 26, 2008, directed to U.S. Appl. No. 11/057,050; 25 pages.
Zadesky et al, U.S. Office Action mailed Aug. 19, 2008, directed to U.S. Appl. No. 11/057,050; 23 pages.
Zadesky et al., U.S. Office Action mailed Nov. 20, 2007, directed to U.S. Appl. No. 11/057,050; 33 pages.
Zadesky et al., U.S. Office Action mailed Mar. 5, 2009, directed to U.S. Appl. No. 11/477,469; 12 pages.
Zadesky et al., U.S. Office Action mailed Jul. 30, 2004, directed to U.S. Appl. No. 10/188,182; 7 pages.
Zadesky et al., U.S. Office Action mailed Sep. 21, 2005, directed to U.S. Appl. No. 10/188,182; 10 pages.
Zadesky et al., U.S. Office Action mailed Mar. 4, 2004, directed to U.S. Appl. No. 10/188,182; 8 pages.
Zadesky et al., U.S. Office Action mailed Oct. 4, 2007, directed to U.S. Appl. No. 11/386,238; 12 pages.
Zadesky et al.., U.S. Office Action mailed Oct. 4, 2007, directed to U.S. Appl. No. 11/806,957; 14 pages.
Marriott et al., U.S. Office Action mailed Jan. 30, 2008, directed to U.S. Appl. No. 10/722,948; 17 pages.
Marriott et al., U.S. Office Action mailed Jul. 13, 2007, directed to U.S. Appl. No. 10/722,948; 15 pages.
Marriott et al., U.S. Office Action mailed Dec. 12, 2006, directed to U.S. Appl. No. 10/722,948; 14 pages.
Marriott et al., U.S. Office Action mailed Jun. 2, 2006, directed to U.S. Appl. No. 10/722,948; 12 pages.
Hotelling et al., U.S. Office Action mailed Jul. 24, 2009, directed to U.S. Appl. No. 11/483,008; 17 pages.
Hotelling et al., U.S. Office Action mailed Jul. 27, 2009, directed to U.S. Appl. No. 11/882,420; 17 pages.
Elias et al., U.S. Office Action mailed Aug. 4, 2009, directed to U.S. Appl. No. 11/203,692; 12 pages.
Elias et al., U.S. Office Action mailed Feb. 23, 2009, directed to U.S. Appl. No. 11/203,692; 13 pages.
Elias et al., U.S. Office Action mailed Sep. 17, 2008, directed to U.S. Appl. No. 11/203,692; 8 pages.
Tsuk et al., U.S. Office Action mailed Aug. 6, 2010, directed to U.S. Appl. No. 11/610,190; 30 pages.
Zadesky et al., U.S. Office Action mailed Aug. 2, 2010, directed to U.S. Appl. No. 11/882,004; 9 pages.
Marriott et al., U.S. Office Action mailed Aug. 19, 2010, directed to U.S. Appl. No. 11/882,422; 13 pages.
Hotelling, U.S. Office Action mailed Aug. 18, 2010, directed to U.S. Appl. No. 11/882,424; 16 pages.
Bull, U.S. Office Action mailed Jul. 9, 2010, directed to U.S. Appl. No. 11/849,801; 13 pages.
"About Quicktip®" www.logicad3d.com/docs/gt.html, downloaded Apr. 8, 2002.
"Alps Electric Ships GlidePoint Keyboard for the Macintosh; Includes a GlidePoint Touchpad, Erase-Eaze Backspace Key and Contoured Wrist Rest," Business Wire (Jul. 1, 1996).
"Alps Electric introduces the GlidePoint Wave Keyboard; combines a gently curved design with Alps' advanced GlidePoint Technology," Business Wire (Oct. 21, 1996).

(56) References Cited

OTHER PUBLICATIONS

"Apple Presents iPod: Ultra-Portable MP3 Music Player Puts 1,000 Songs in Your Pocket," retreived from http://www.apple.com/pr/library/2001/oct/23ipod.html on Oct. 23, 2001.
"Apple Unveils Optical Mouse and New Pro Keyboard," Press Release, Jul. 19, 2000.
"APS show guide to exhibitors," Physics Today 49(3) (Mar. 1996).
"Atari VCS/2600 Peripherals," www.classicgaming.com/gamingmuseum/2006p.html, downloaded Feb. 28, 2007, pp. 1-15.
"Der Klangmeister," Connect Magazine, Aug. 1998.
"Design News literature plus," Design News 51(24) (Dec. 18, 1995).
"Neuros MP3 Digital Audio Computer," www.neurosaudio.com, downloaded Apr. 9, 2003.
"OEM Touchpad Modules" website www.glidepoint.com/sales/modules.index.shtml, downloaded Feb. 13, 2002.
"Product Overview—ErgoCommander®," www.logicad3d.com/products/ErgoCommander.htm downloaded Apr. 8, 2002.
"Product Overview—SpaceMouse® Classic," www.logicad3d.com/products/Classic.htm downloaded Apr. 8, 2002.
"System Service and Troubleshooting Manual," www.dsplib.com/intv/Master, downloaded Dec. 11, 2002.
"Synaptics Tough Pad Interfacing Guide," Second Edition, Mar. 25, 1998, Synaptics, Inc., San Jose, CA, pp. 1-90.
"Triax Custom Controllers due; Video Game Controllers," HFD—The Weekly Home Furnishing Newspaper 67(1) (Jan. 4, 1993).
Ahl, David, "Controller Update," Creative Computing vol. 9, No. 12, Dec. 1983.
Ahmad, "A Usable Real-Time 3D Hand Tracker," Proceedings of the 28th Asilomar Conference on Signals, Systems and Computers—Part 2 (of 2) vol. 2 (Oct. 1994).
Baig, E.G., "Your PC Just Might Need a Mouse," U.S. News & World Report 108(22) (Jun. 4, 1990).
Bang & Olufsen Telecom a/s, "BeoCom 6000 User Guide 2000".
Bartimo, Jim, "The Portables: Travelling Quickly," Computerworld (Nov. 14, 1983).
BeoCom 6000, Sales Training Brochure, date unknown.
Bray, "Phosphors help switch on xenon," Physics in Action, pp. 1-3, Apr. 1999.
Brink et al., "Pumped-up portables," U.S. News & World Report 116(21) (May 30, 1994).
Brown et al., "Windows on Tablets as a Means of Achieving Virtual Input Devices," Human-Computer Interaction—Interact '90 (1990).
Buxton et al., "Issues and Techniques in Touch-Sensitive Tablet Input," Computer Graphics 19(3), Proceedings of SIGGRAPH '85 (1985).
Chapweske, Adam "PS/2 Mouse/Keyboard Protocol," 1999, http://panda.cs.ndsu.nodak.edu/~achapwes/PICmicro/PS2/ps2.htm.
Chen et al., "A Study in Interactive 3-D Rotation Using 2-D Control Devices," Computer Graphics 22(4) (Aug. 1988).
Chinese Office Action issue Dec. 29, 2006, directed to CN Application No. 200510103886.3, 25 pages.
De Meyer, Kevin, "Crystal Optical Mouse," Feb. 14, 2002, Heatseekerz, Web Article 19.
Evans et al., "Tablet-based Valuators that Provide One, Two, or Three Degrees of Freedom," Computer Grahics 15(3) (Aug. 1981).
Evb Elektronik "TSOP6238 IR Receiver Modules for Infrared Remote Control Systems" dated Jan. 2004 1 page.
Fiore, "Zen Touchpad," Cornell University, May 2000.
Gadgetboy, "Point and click with the latest mice," CNET Asia Product Review, www.asia.cnet.com/reviews...are/gadgetboy/0,39001770,380235900,00.htm, downloaded Dec. 5, 2001.
Gfroerer, "Photoluminescence in Analysis of Surfaces and Interfaces," Encyclopedia of Analytical Chemistry, pp. 1-23, Copyright John Wiley & Sons Ltd, Chichester, 2000.
Jesitus, John, "Broken promies?", Industry Week/IW 246(20) (Nov. 3, 1997).
Kobayashi (1996) "Design of Dynamic Soundscape: Mapping Time to Space for Audio Browsing with Simultaneous Listening," Thesis submitted to Program in Media Arts and Sciences at the Massachusetts Institute of Technology, (58 pages).
Kobayashi et al. (1997) "Dynamic Soundscape: Mapping Time to Space for Audio Browsing," Computer Human Interaction: 16 pages.
Kobayashi et al. "Development of the Touch Switches with the Click Response," Koukuu Denshi Gihou No. 17, pp. 44-48 (1994-3) (published by the Japan Aviation Electronics Industry, Ltd.).
Letter re: Bang & Olufsen a/s by David Safran, Nixon Peabody, LLP May 21, 2004.
Luna Technologies International, Inc., Luna Photoluminescent Safety Products, "Photoluminescence—What is Photoluminescence?" from website at http://www.lunaplast.com/photoluminescence.com on Dec. 27, 2005.
"Manufactures," Laser Focus World, Buyers Guide '96, 31(12) (Dec. 1995).
Mims, Forrest M., III, "A Few Quick Pointers; Mouses, Touch Screens, Touch Pads, Light Pads, and the Like Can Make System Easier to Use," Computers & Electronics (22) (May 1984).
Nass, Richard, "Touchpad input device goes digital to give portable systems a desktop 'mouse-like' feel," Electronic Design 44(18) (Sep. 3, 1996).
"National Design Engineering Show," Design News 52(5) (Mar. 4, 1996).
Perenson, Melissa, "New & Improved: Touchpad Redux," PC Magazine (Sep. 10, 1996).
Petersen, Marty, "Koala Pad Touch Tablet & Micro Illustrator Software," InfoWorld (Oct. 10, 1983).
Petruzzellis, "Force-Sensing Resistors," Electronics Now 64(3) (Mar. 1993).
Photographs of Innovation 2000 Best of Show Award Presented at the 2000 Int'l CES Innovations 2000 Design & Engineering Showcase, 1 page.
"Preview of exhibitor booths at the Philadelphia show," Air Conditioning, Heating & News 200(2) (Jan. 13, 1997).
"Product news," Design News 53(9) (May 5, 1997).
"Product news," Design News 53(11) (Jun. 9, 1997).
Sony presents "Choice Without Compromise" at IBC '97 M2 Presswire (Jul. 24, 1997).
Spiwak, Marc, "A Great New Wireless Keyboard," Popular Electronics 14(12) (Dec. 1997).
Spiwak, Marc, "A Pair of Unusual Controllers," Popular Electronics 14(4) (Apr. 1997).
Soderholm, Lars G., "Sensing Systems for 'Touch and Feel,'" Design News (may 8, 1989): pp. 72-76.
Sylvania, "Intellvision™ Intelligent Television Master Component Service Manual," pp. 1, 2 and 8, 1979.
Tessler, Franklin, "Point Pad," Macworld 12(10) (Oct. 1995).
Tessler, Franklin, "Touchpads," Macworld 13(2) (Feb. 1996).
Tessler, Franklin, "Smart Input: How to Chose from the New Generation of Innovative Input Devices," Macworld 13(5) (May 1996).
"Touchpad," Notebook PC Manual, ACER Information Co. Ltd., Feb. 16, 2005, pp. 11-12.
SanDisk Sansa Connect User Guide; 29 pages.
Translation of Trekstor's Defense Statement to the District Court Mannheim of May 23, 2008; 37 pages.
"Diamond Multimedia Announces Rio PMP300 Portable MP3 Music Player," located at http://news.harmony-central.com/Newp/1998/Rio-PMP300.html visited on May 5, 2008. (4 pages).
IPRP and Written Opinion mailed Sep. 14, 2010, directed to counterpart application No. PCT/US2009/036806; 7 pages.
Tsuk et al., U.S. Office Action mailed Nov. 1, 2010, directed to U.S. Appl. No. 11/959,918; 9 pages.
Tsuk et al., U.S. Office Action mailed Oct. 26, 2010, directed to U.S. Appl. No. 11/959,942; 27 pages.
Robbin et al., U.S. Office Action mailed Oct. 29, 2010, directed to U.S. Appl. No. 11/838,845; 8 pages.
Ng et al., U.S. Office Action mailed Oct. 26, 2010, directed to U.S. Appl. No. 11/882,423; 18 pages.
Zadesky et al., U.S. Office Action mailed Oct. 4, 2010, directed to U.S. Appl. No. 11/057,050; 31 pages.

(56) References Cited

OTHER PUBLICATIONS

McKillop et al., U.S. Office Action mailed Sep. 16, 2010, directed to U.S. Appl. No. 11/591,752; 14 pages.
Zadesky et al., U.S. Office Action mailed Sep. 29, 2010, directed to U.S. Appl. No. 11/882,003; 13 pages.
Hotelling, U.S. Office Action mailed Oct. 1, 2010, directed to U.S. Appl. No. 11/482,286; 28 pages.
Hotelling et al., U.S. Office Action mailed Oct. 27, 2010, directed to U.S. Appl. No. 11/483,008; 23 pages.
Weber et al., U.S. Office Action mailed Oct. 13, 2010, directed to U.S. Appl. No. 12/205,795; 15 pages.
Zadesky et al, U.S. Office Action mailed Feb. 1, 2011, directed to U.S. Appl. No. 11/882,004; 16 pages.
Bull, U.S. Office Action mailed Feb. 4, 2011, directed to U.S. Appl. No. 11/849,801; 22 pages.
Weber et al, U.S. Office Action mailed Jan. 7, 2011, directed to U.S. Appl. No. 11/856,530; 13 pages.
Weber et al., U.S. Office Action mailed Jan. 7, 2011, directed to U.S. Appl. No. 12/205,795; 21 pages.
Weber et al., U.S. Office Action mailed Feb. 17, 2011, directed to U.S. Appl. No. 12/844,502; 11 pages.
Ng et al., U.S. Office Action mailed Dec. 9, 2010, directed to U.S. Appl. No. 11/394,493; 13 pages.
Zadesky et al., U.S. Office Action mailed Nov. 16, 2010, directed to U.S. Appl. No. 11/477,469; 13 pages.
Lampell, U.S. Office Action mailed Dec. 3, 2010, directed to U.S. Appl. No. 11/530,807; 17 pages.
Lampell et al., U.S. Office Action mailed Dec. 22, 2010, directed to U.S. Appl. No. 11/882,427; 16 pages.
Hotelling, U.S. Office Action mailed Dec. 8, 2010, directed to U.S. Appl. No. 11/482,286; 33 pages.
Elias et al., U.S. Office Action mailed Nov. 22, 2010, directed to U.S. Appl. No. 11/203,692; 6 pages.
Robbin, U.S. Appl. No. 60/346,237 entitled, "Method and System for List Scrolling," filed Oct. 22, 2001; 12 pages.
Zadesky et al., U.S. Appl. No. 60/359,551 entitled "Touchpad for Handheld Device," filed Feb. 25, 2002; 34 pages.
Grignon et al., U.S. Appl. No. 60/755,656, filed Dec. 30, 2005, entitled "Touch Pad with Feedback"; 109 pages.
Elias et al., U.S. Appl. No. 60/522,107, filed Aug. 16, 2004, entitled, "A Method for Increasing the Spatial Resolution of Touch Sensitive Devices"; 15 pages.
Hotelling, U.S. Appl. No. 60/658,777 titled "Multi-Functional Hand-held Device," filed Mar. 4, 2005; 68 pages.
Zadesky et al., U.S. Appl. No. 60/714,609 entitled "Scrolling Input Arrangements Using Capacitive Sensors on a Flexible Membrane," filed Sep. 6, 2005; 17 pages.
Lampell et al., U.S. Appl. No. 60/810,423, filed Jun. 2, 2006, entitled "Techniques for Interactive Input to Portable Electronic Devices"; 53 pages.
Prest et al., U.S. Appl. No. 60/850,662, filed Oct. 11, 2006, entitled, "Capacitive Scroll Wheel"; 21 pages.
Bollinger, U.S. Appl. No. 60/858,404 filed Nov. 13, 2006, entitled "Method of Capacitively Sensing Finger Position"; 13 pages.
Rothkopf, U.S. Appl. No. 60/935,854 titled "Compact Media Players," filed Sep. 4, 2007; 36 pages.
Rathnam et al., U.S. Appl. No. 60/992,056, filed Dec. 3, 2007, entitled, "Scroll Wheel Circuit Arrangements and Methods of Use Thereof"; 42 pages.
Rathnam et al., U.S. Appl. No. 61/017,436, filed Dec. 28, 2007, entitled, "Multi-Touch Scroll Wheel Circuit Arrangements and Processing Methods"; 58 pages.
Weber et al., U.S. Appl. No. 61/020,531, filed Jan. 11, 2008 entitled "Modifiable Clickwheel Text"; 11 pages.
Weber et al., U.S. Appl. No. 61/025,531, filed Feb. 1, 2008 entitled "Co-Extruded Materials and Methods"; 11 pages.

Fisher et al., U.S. Appl. No. 61/036,804, filed Mar. 14, 2008 entitled "Switchable Sensor Configurations"; 46 pages.
Beaver et al., U.S. Appl. No. 12/042,318, filed Mar. 4, 2008 entitled, "Touch Event Model"; 36 pages.
Tsuk et al., U.S. Office Action mailed Apr. 28, 2010, directed to U.S. Appl. No. 11/610,190; 29 pages.
Zadesky et al., U.S. Office Action mailed Mar. 30, 2010, directed to U.S. Appl. No. 11/592,679; 13 pages.
Hotelling et al., U.S. Office Action mailed Mar. 30, 2010, directed to U.S. Appl. No. 11/483,008; 20 pages.
Elias et al., U.S. Office Action mailed Mar. 30, 2010, directed to U.S. Appl. No. 11/203,692; 15 pages.
Ng et al., U.S. Office Action mailed Jul. 8, 2010, directed to U.S. Appl. No. 11/882,423; 19 pages.
Tsuk et al., U.S. Office Action mailed Aug. 7, 2009, directed to U.S. Appl. No. 11/610,181; 20 pages.
Robbin et al., U.S. Office Action mailed Aug. 10, 2009, directed to U.S. Appl. No. 11/610,376; 11 pages.
Robbin at al., U.S. Office Action mailed Aug. 12, 2009, directed to U.S. Appl. No. 11/610,384; 20 pages.
Hotelling, U.S. Office Action mailed Sep. 1, 2009, directed to U.S. Appl. No. 11/482,286; 14 pages.
Lampell, U.S. Office Action mailed Sep. 15, 2009, directed to U.S. Appl. No. 11/530,807; 15 pages.
Boling, Douglas (1993) "Programming Microsoft Windows ce.net," p. 109.
Lynch et al., U.S. Office Action mailed Oct. 5, 2009, directed to U.S. Appl. No. 11/499,360; 7 pages.
Lynch et al., U.S. Office Action mailed Jan. 27, 2010, directed to U.S. Appl. No. 11/499,360; 8 pages.
Ng et al., U.S. Office Action mailed Jan. 14, 2010, directed to U.S. Appl. No. 11/394,493; 20 pages.
Ng et al., U.S. Office Action mailed Jan. 15, 2010, directed to U.S. Appl. No. 11/882,423; 22 pages.
Tsuk et al., U.S. Office Action mailed Dec. 31, 2009, directed to U.S. Appl. No. 11/610,190; 25 pages.
Zadesky et al., U.S. Office Action mailed Feb. 4, 2010, directed to U.S. Appl. No. 11/477,469; 14 pages.
Hotelling, U.S. Office Action mailed Jan. 25, 2010, directed to U.S. Appl. No. 11/482,286; 17 pages.
Interlink Electronics, VersaPad: Integration Guide, ©1998 (VersaPad), pp. 1-35.
Letter re: Bang & Olufsen a/s by David Safran, Nixon Peabody, LLP, May 21, 2004, with BeoCom 6000 Sales Training Brochure, 7 pages.
Kobayashi et al. (1994) "Development of the Touch Switches with the Click Response," Koukuu Denshi Gihou No. 17, pp. 44-48 (published by the Japan Aviation Electronics Industry, Ltd.).
Photographs of Innovation 2000 Best of Show Award Presented at the 2000 Int'l CES Innovations Design & Engineering Showcase, Jan. 6, 2000, 1 page.
SanDisk Sansa Connect User Guide, 2007; 29 pages.
Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.
Rubine, D.H. (May 1992). "Combining Gestures and Direct Manipulation," CHI ' 92, pp. 659-660.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

\* cited by examiner

SENSOR CONFIGURATIONS OF AN INPUT DEVICE THAT ARE SWITCHABLE BASED ON MODE

CROSS REFERENCE TO RELATED APPLICATION

This claims priority under 35 USC 119(e) to U.S. Provisional Application No. 61/036,804, filed Mar. 14, 2008, the entirety of which is incorporated by reference herein.

FIELD OF THE DISCLOSURE

This relates generally to input devices, and more particularly to an input device with switchable sensor configurations.

BACKGROUND

Several kinds of input devices exist for performing operations in portable computing devices. Some examples of input devices include buttons, switches, keyboards, mice, trackballs, touch pads, joy sticks, touch screens and the like. Some examples of portable computing devices include media players, remote controls, personal digital assistants (PDAs), cellular phones, etc. Operations performed by the input devices generally include moving a cursor and selecting items displayed on a display screen of the portable computing devices.

As portable computing devices evolve, they tend to decrease in size and provide enhanced features. In light of this, designing input devices for these portable devices can present unique issues. For example, while enhanced features usually require more power, a decrease in device size can impact the amount of power available for the enhanced features.

Accordingly, the design of input devices for such portable devices can be constrained by efforts to conserve a limited supply of power.

SUMMARY

To achieve power savings during the operation of a portable computing device, an input device can be provided with switchable sensor configurations.

For example, depending upon a mode of detection, the input device can disable some of its sensor elements from sensing input or combine some its sensor elements to collectively sense input. Disabling or combining sensor elements can reduce the amount of power necessary to operate the input device.

In one embodiment, the input device can switch between a sensor configuration in which each of its sensor elements is enabled to sense input (e.g., a "full detect" mode) and a sensor configuration in which only a subset of its sensor elements are enabled to sense input (e.g., a "partial detect" mode).

In the partial detect mode, the enabled sensor elements can be arranged according to a predefined input pattern, such as a pattern corresponding to an input event in the form of a linear, rotational or other gestural input event for example.

The sensor configuration in the partial detect mode can achieve power savings because the disabled sensor elements are not being used to sense input.

In another embodiment, the input device can switch between a sensor configuration in full detect mode and a sensor configuration in which one or more groupings of its sensor elements are enabled to collectively sense input (e.g., a "group detect" mode).

In the group detect mode, the groupings of sensor elements can be arranged in any fashion, such as radially or in angular sectors around a point, for example. When the sensor elements of a grouping are arranged radially, the input device can determine a single radial position based on an input sensed by any of the sensor elements in the radial grouping. Similarly, when the sensor elements of a grouping are arranged in an angular sector, the input device can determine a single angular position based on an input sensed by any of the sensor elements in the angular sector grouping.

The sensor configuration in the group detect mode can achieve power savings because the input device only performs a single scan of the group's combined sensor elements, rather than performing individual scans of each element in the group.

According to other embodiments, the input device can operate in a single detection mode in which sensor configurations are switched.

For example, the input device can operate in a partial detect mode in which sensor configurations are switched based on an orientation of the portable computing device. For instance, in a "orientation bias" mode, the input device can switch which subsets of its sensor elements are enabled so that a predefined pattern of the enabled sensor elements (such as a horizontal swipe pattern, for example) has the same orientation relative to a user of the portable computing device at any device orientation.

In another example, the input device can operate in a group detect mode in which sensor configurations are switched to determine a position of the input on the input device. For instance, in a "switch detect" mode, the input device can switch between a radial grouping of elements to determine a radial position of an input, and an angular sector grouping of elements to determine an angular position of the input. The input device can then output a combined radial and angular position of the input.

The input device can switch between sensor configurations based on any number of factors, such as an orientation of the portable computing device or a context of an application running on the portable computing device, for example.

DETAILED DESCRIPTION

The present disclosure describes embodiments of an input device having switchable sensor configurations. The input device can achieve power savings by switching between various sensor configurations when sensing input from its sensor elements.

For example, depending upon a mode of detection, the input device can disable some of its sensor elements from sensing input or combine some its sensor elements to collectively sense input. Disabling or combining sensor elements can reduce the amount of power necessary to operate the input device.

Figure 1:
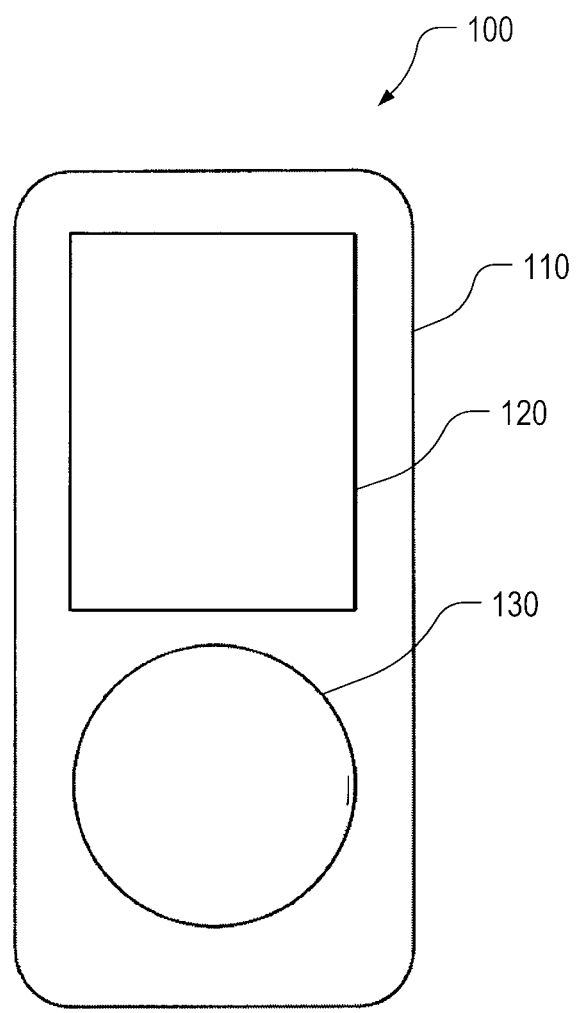
FIG. 1 illustrates an example of an electronic device.

FIG. 1 illustrates an example of an electronic device. The electronic device may be any consumer electronic product. The electronic device may be a computing device and more particularly it may be a media player, PDA, phone, remote control, camera and the like. In the embodiment illustrated in FIG. 1, the electronic device 100 may correspond to a media player. The term "media player" generally refers to computing devices dedicated to processing media such as audio, video or other images, including, for example, music players, game players, video players, video recorders and the like. These devices can be portable to allow a user to, for example, listen to music, play games or video, record video or take pictures wherever the user travels. In one embodiment, the electronic device can be a handheld device that is sized for placement into a pocket of the user. By being pocket sized, the device may be taken almost anywhere the user travels (e.g., the user is not limited by carrying a large, bulky and often heavy device, as in a portable computer). Furthermore, the device can be operated in the user's hands, thus no reference surface such as a desktop is required.

Electronic devices (e.g., media players) generally have connection capabilities that allow a user to upload and download data to and from a host device, such as a general purpose computer (e.g., desktop computer, portable computer, etc.). For example, in the case of a camera, photo images can be downloaded to the general purpose computer for further processing (e.g., printing). With regard to music players, for example, songs and play lists stored on the general purpose computer can be downloaded into the music player. In the embodiment illustrated in FIG. 1, electronic device 100 can be a pocket-sized hand-held media player (e.g., MP3 player) that allows a user to store a collection of music, photos, album art, contacts, calendar entries, and other desirable media assets. It should be appreciated however, that media players are not a limitation as the electronic device may be embodied in other forms as mentioned above.

As shown in FIG. 1, electronic device 100 may include housing 110 that can enclose various electrical components, such as integrated circuit chips and other circuitry, for example. The integrated circuit chips and other circuitry may include, for example, a microprocessor, memory (e.g., ROM, RAM), a power supply (e.g., battery), a circuit board, a hard drive or Flash (e.g., Nand flash) for storing media for example, one or more orientation detection elements (e.g., accelerometer) and various input/output (I/O) support circuitry. In the case of music players, the electrical components can include components for outputting music such as an amplifier and a digital signal processor (DSP) for example. In the case of video recorders or cameras the electrical components can include components for capturing images such as image sensors (e.g., charge coupled device (CCD) or complimentary oxide semiconductor (CMOS)) or optics (e.g., lenses, splitters, filters) for example. In addition to the above, the housing can also define the shape or form of the electronic device. That is, the contour of housing 102 may embody the outward physical appearance of electronic device 100 in one embodiment.

Electronic device 100 may also include display screen 120. Display screen 120 can be used to display a graphical user interface as well as other information to the user (e.g., text, objects, graphics). By way of example, display screen 120 may be a liquid crystal display (LCD). In one embodiment, the display screen can correspond to a X-by-Y pixel high-resolution display, with a white LED backlight to give clear visibility in daylight as well as low-light conditions. Display screen 120 can also exhibit a "wide screen" aspect ratio (e.g., similar to a 16:9 aspect ratio) such that it may be relatively easy to perceive portrait and landscape orientations.

Electronic device 100 may also include input device 130. Input device 130 can be configured to provide one or more control functions for controlling various applications associated with electronic device 100. For example, a control function can be used to move an object or perform an action on display screen 120 or to make selections or issue commands associated with operating electronic device 100. Input device 130 may be widely varied. In one embodiment, input device 130 can include a rigid sensor mechanism for detecting input. The rigid sensor mechanism can include, for example, a touch sensitive surface that provides location information for an object, such as a finger for example, in contact with or in proximity to the touch sensitive surface. In another embodiment, input device 130 can include one or more movable sensor mechanisms for detecting input. The movable sensor mechanism can include, for example, one or more moving members that actuate a switch when a particular area of input device 130 is pressed. The movable sensor mechanism may operate as a mechanical push button and perform a clicking action when actuated. In a further embodiment, input device 130 may include a combination of a rigid sensor mechanism and one or more movable sensor mechanisms.

An example of an input device comprising a rigid sensor mechanism may be found in U.S. Pat. No. 7,046,230 entitled "Touch Pad Handheld Device," which is incorporated herein by reference in its entirety. An example of an input device comprising a combination of a rigid sensor mechanism and a movable sensor mechanism may be found in U.S. patent application Ser. No. 11/812,383 entitled "Gimballed Scroll Wheel," filed Jun. 18, 2007, which is incorporated herein by reference in its entirety.

Figure 2:
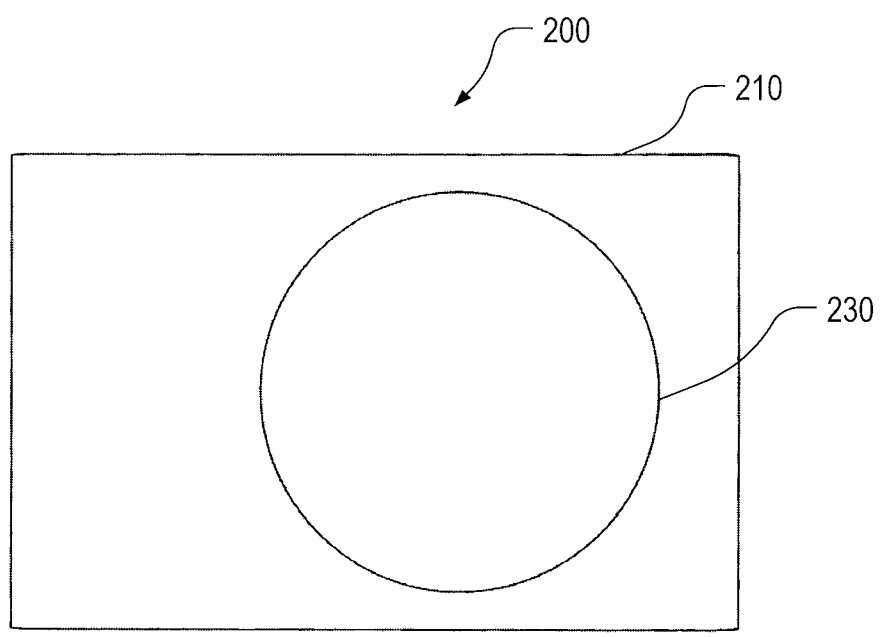
FIG. 2 illustrates an example of an electronic device.

FIG. 2 illustrates an embodiment of an electronic device without a display screen. In the embodiment illustrated in FIG. 2, electronic device 200 may include housing 210 that may generally correspond to housing 110, and input device 230 that may generally correspond to input device 130. The lack of a display screen allows electronic device 200 to be configured with smaller dimensions than those of electronic device 100. For example, in one embodiment, electronic device 200 may be less than two inches wide and less than two inches tall.

Figure 3:
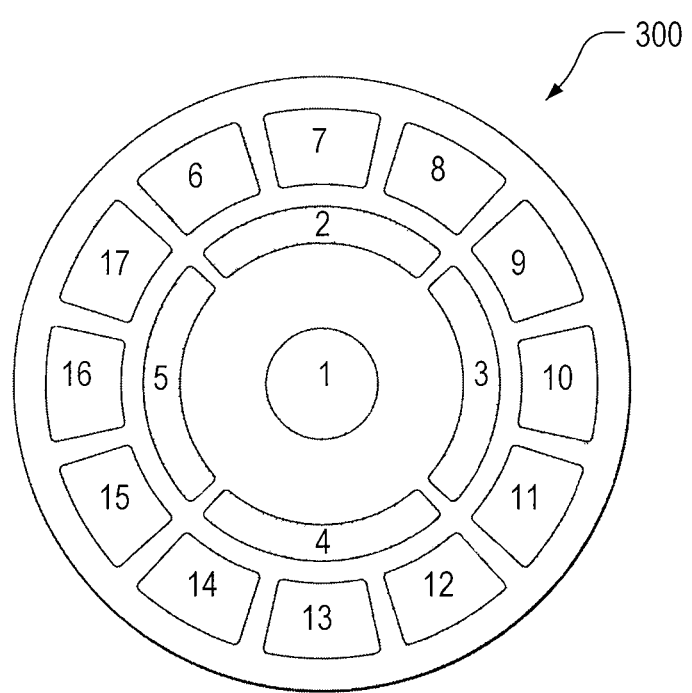
FIG. 3 illustrates an example of a 30-element capacitive sensor element arrangement.
Figure 12:
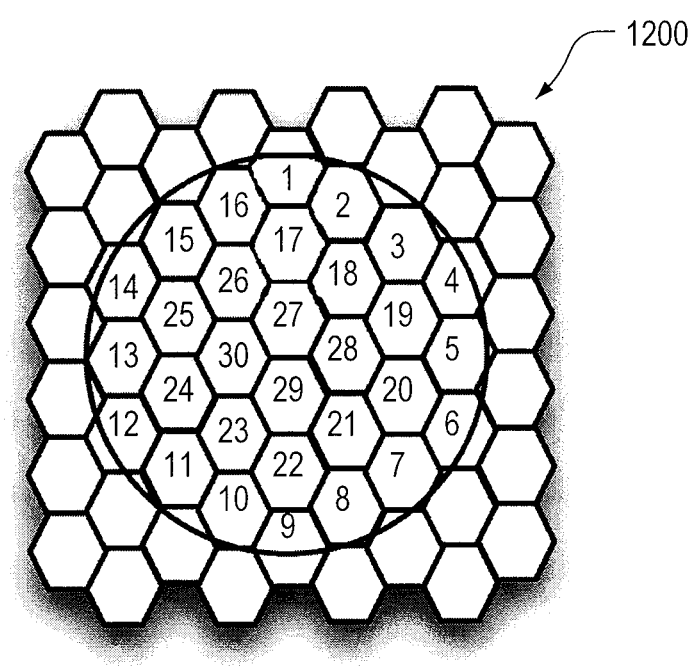
FIG. 12 illustrates an example of a 30-element capacitive sensor element arrangement.
Figure 13A:
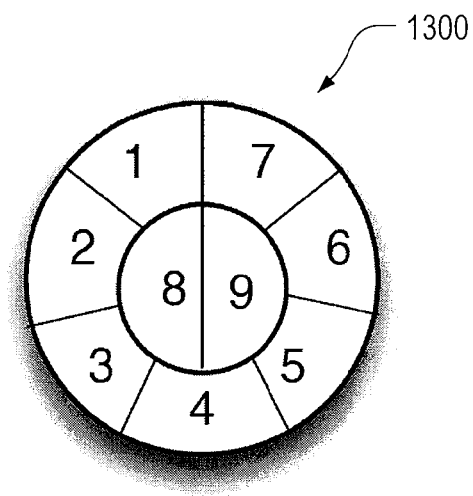
FIGS. 13A-13C illustrate examples of 9-element capacitive sensor element arrangements.
Figure 13B:
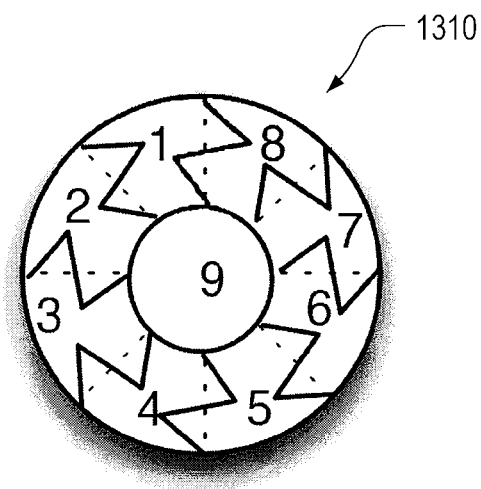
Figure 13C:
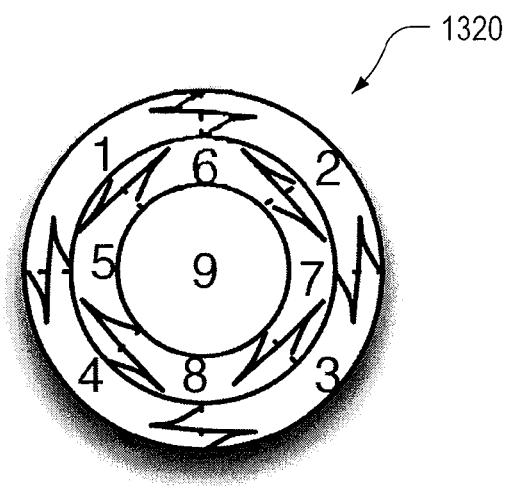

FIGS. 3 and 11-13 illustrate examples of some arrangements of capacitive sensor elements that can be configured to sense touch events caused by an object, such as a finger, in contact with or in proximity to a touch sensitive surface of an input device corresponding to the embodiments described above. FIG. 3 illustrates an example of 17-element arrangement. FIGS. 11A-11C illustrate examples of 15-element arrangements. FIG. 12 illustrates an example of a 30-element element arrangement. FIGS. 13A-13C illustrate examples of 9-element arrangements.

Touch events detectable by the capacitive sensor elements of the input device may be widely varied, and may include, for example, rotational motion, linear motion, taps, holds, and other gestures and any combinations thereof provided by one (single touch input) or more than one (multi-touch input) of a user's fingers across the touch sensitive surface. The capacitive sensor elements can be configured to detect input based on self capacitance (as illustrated in FIGS. 3 and 11-13) or mutual capacitance. In self capacitance, the "self" capacitance of a single electrode is measured as for example relative to ground. In mutual capacitance, the mutual capacitance between at least first and second electrodes is measured. In either case, each of the sensor elements can work independent of the other sensor elements to produce simultaneously occurring signals representative of different points of input on the touch sensitive surface at a particular time. The input device can include a controller configured to detect input sensed by the sensor elements by measuring a change in capacitance of the sensor elements.

An example of an input device configured to detect multiple simultaneous touches or near touches may be found in U.S. patent application Ser. No. 10/840,862 entitled "Multipoint Touchscreen," filed May 6, 2004, which is incorporated herein by reference in its entirety. An example of a touch event model that can be associated with such an input device may be found in U.S. patent application Ser. No. 12/042,318 entitled "Touch Event Model," filed Mar. 4, 2008, which is incorporated herein by reference in its entirety. An example of gestures that may be implemented on such an input device may be found in U.S. patent application Ser. No. 11/818,342 entitled "Gestures for Controlling, Manipulating, and Editing of Media Files Using Touch Sensitive Devices," filed Jun. 13, 2007, which is incorporated herein by reference in its entirety.

The present disclosure is not limited to the input devices illustrated herein. Rather, an input device of any suitable technology or configuration for enabling detection of input in accordance with the teachings of the present disclosure can be utilized. For the purposes of the following discussion in connection with FIGS. 4-10, the input device comprises a touch sensitive surface implemented by capacitive sensor element arrangement 300.

Figure 4:
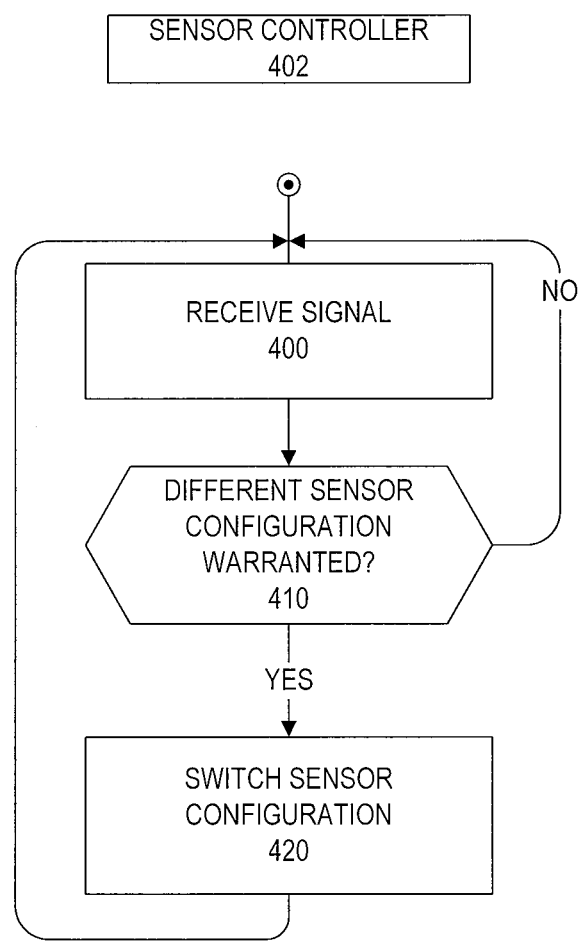
FIG. 4 illustrates an example of switchable sensor configuration process.

FIG. 4 illustrates an example of a process in which the sensor controller can switch a sensor configuration of its sensor elements. In the illustrated embodiment, the input device can include sensor controller 402, which can be configured to enable only some of the sensor elements to sense input, or to combine some the sensor elements to collectively sense input, for example. Upon receiving a signal relevant to a mode of detection of the input device (step 400), controller 402 can determine whether a different sensor configuration is warranted (step 410). If a different sensor configuration is warranted, controller 402 can switch the sensor configuration (step 410). Otherwise, the input device can continue sensing input in its current sensor configuration. The type of sensor configurations that may be utilized by the input device may be widely varied.

For example, in one embodiment, the input device can switch between a sensor configuration in which each of its sensor elements is enabled to sense input (e.g., a "full detect" mode) and a sensor configuration in which only a subset of its sensor elements are enabled to sense input (e.g., a "partial detect" mode). In the partial detect mode, the enabled sensor elements can be arranged according to a predefined input pattern, such as a pattern corresponding to an input event in the form of a linear, rotational or other gestural input event for example.

This mode may be utilized, for example, when only a particular type of predefined input event is expected at the input device. The sensor configuration in the partial detect mode can achieve power savings because the disabled sensor elements are not being used to sense input.

Figure 5A:
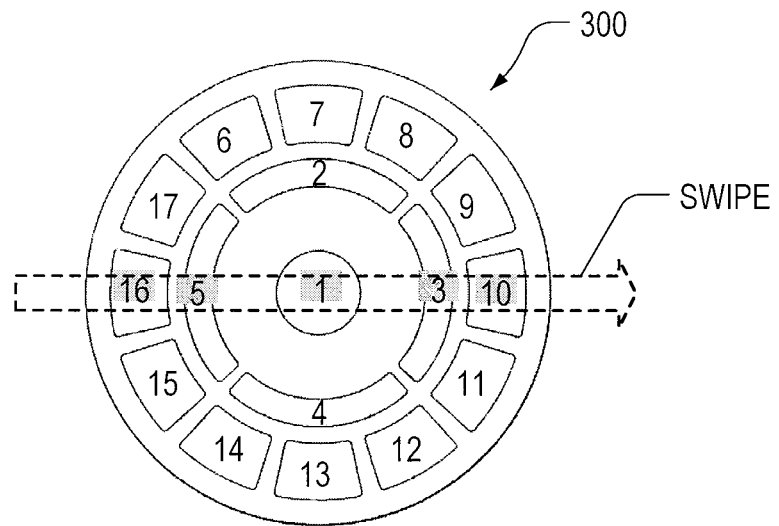
FIGS. 5A-5D illustrate examples of sensor configurations.

FIG. 5A illustrates an example of one type of partial detect mode in which only linearly arranged sensor elements 16-5-1-3-10 are enabled to sense input, while the remaining sensor elements are disabled from sensing input. This mode may be referred to as a "swipe" mode for example. Although the enabled sensor elements in the illustrated example are arranged relative to the horizontal axis, the sensor elements in a swipe mode may be arranged according to any predefined axis in the practice of the present disclosure.

Figure 5B:
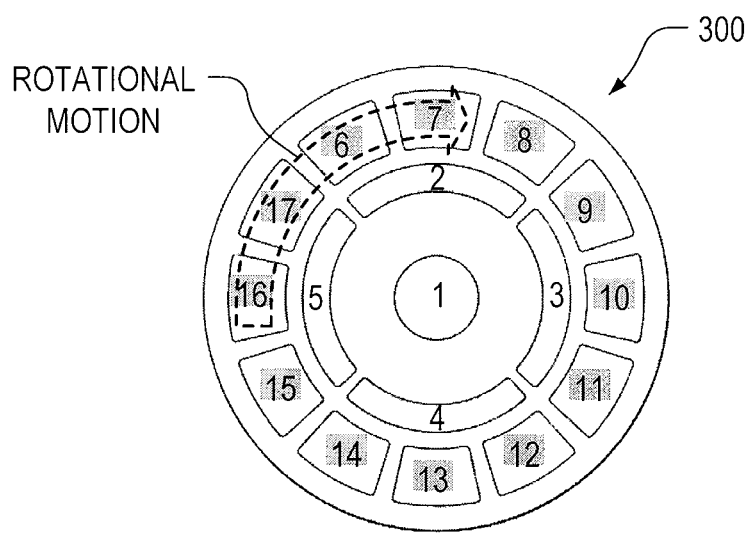
Figure 5C:
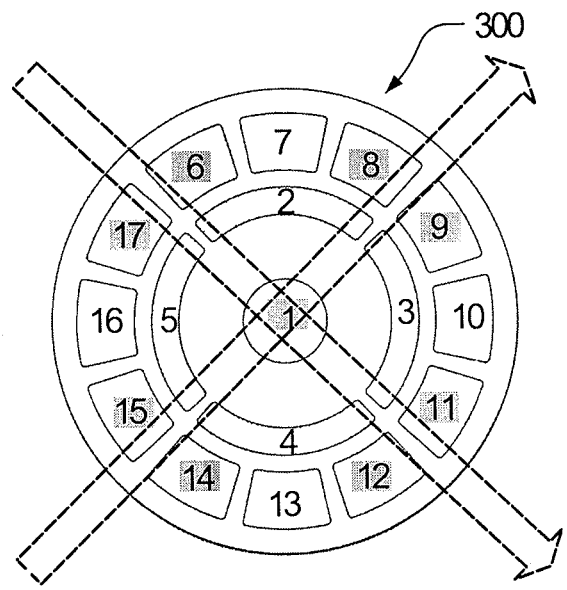
Figure 5D:
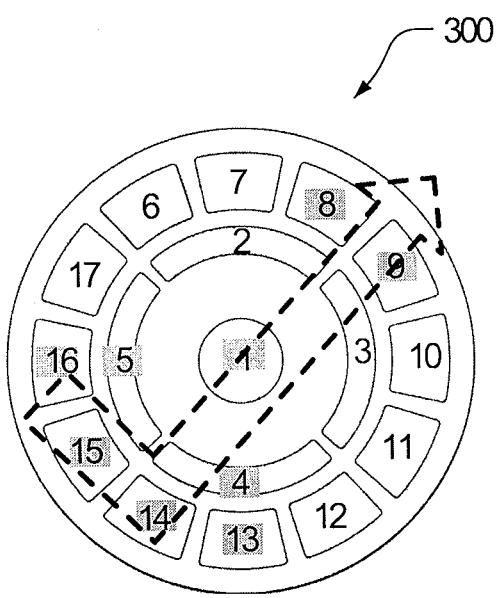

FIG. 5B illustrates an example of another type of partial detect mode in which only annularly arranged sensor elements 6-7-8-9-10-11-12-13-14-15-16-17 are enabled to sense input, while the remaining sensor elements are disabled from sensing input. This mode may be referred to as a "scroll wheel" mode for example. Although the enabled sensor elements in the illustrated example are arranged along the outer periphery of sensor element arrangement 300, the sensor elements in a scroll wheel mode may be arranged according to any annular pattern in the practice of the present disclosure.

In a further example, only sensor elements arranged according to a predefined gestural input pattern can be enabled, while the remaining sensor elements are disabled. Examples of predefined gestural input patterns may include alphanumeric characters, such as an "X" for example (see FIG. 5C), and symbols, such as a check mark for example (see FIG. 5D). This mode may be referred to as a "gesture" mode for example.

Additionally, any subset of sensor elements arranged according to any predefined pattern of single-touch and/or multi-touch input events can be enabled in the partial detect mode. For purposes of the present disclosure, a subset of sensor elements does not encompass all sensor elements of sensor element arrangement 300.

In another embodiment, the input device can switch between a sensor configuration in full detect mode and a sensor configuration in which one or more groupings of its sensor elements are enabled to collectively sense input (e.g., a "group detect" mode). The input device can enable a grouping of sensor elements to collectively sense input by electrically connecting each sensor element together so that they act as if they were one sensor element. In the group detect mode, the groupings of sensor elements can be arranged in any fashion. The sensor configuration in the group detect mode can achieve power savings because the input device only performs a single scan of each group's combined sensor elements, rather than performing individual scans of each element in each group.

Figure 6A:
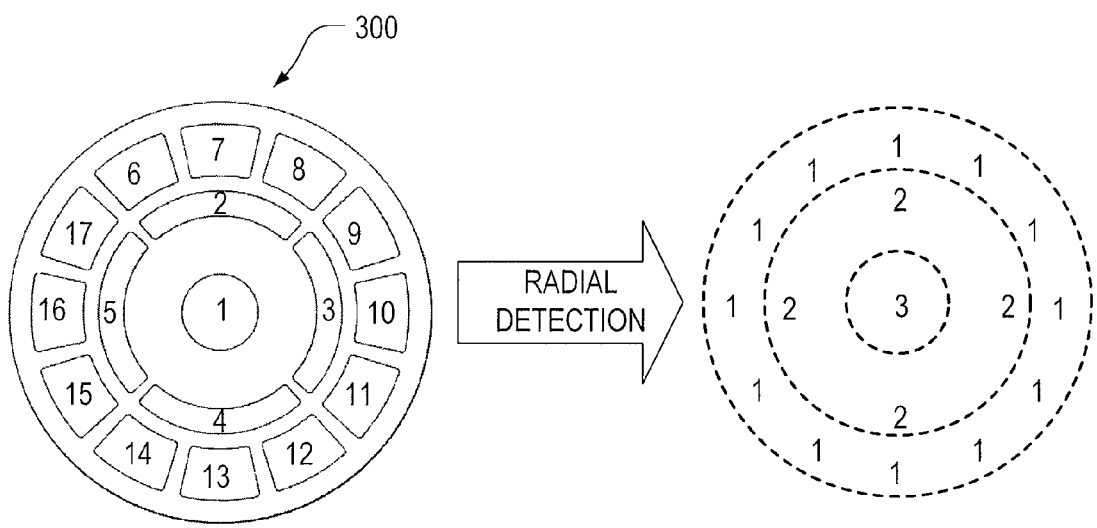
FIGS. 6A-6B illustrate examples of sensor configurations.

FIG. 6A illustrates an example of one type of group detect mode in which the sensor elements of a grouping are arranged radially from a center point of sensor element arrangement 300. This mode may be referred to as a "radial detection" mode for example. In the illustrated embodiment, sensor elements 6-7-8-9-10-11-12-13-14-15-16-17 form a first grouping and sensor elements 2-3-4-5 form a second grouping. In this group detect mode, the input device can determine a single radial position (e.g., outer periphery) based on an input sensed by any of the sensor elements in the first grouping. Similarly, a single radial position (e.g., inner periphery) can be determined based on an input sensed by any of the sensor elements in the second grouping. Accordingly, in this example, only three combined sensor elements needed to be scanned in group detect mode in order to determine a radial position of an input, rather than 17 individual sensor elements being scanned in full detect mode in order to determine an absolute position of the input.

An example of an input device configured to group sensor elements into different logical units may be found in U.S. patent application Ser. No. 10/722,948 entitled "Touch Pad for Handheld Device," filed Nov. 25, 2003, which is incorporated herein by reference in its entirety.

Figure 6B:
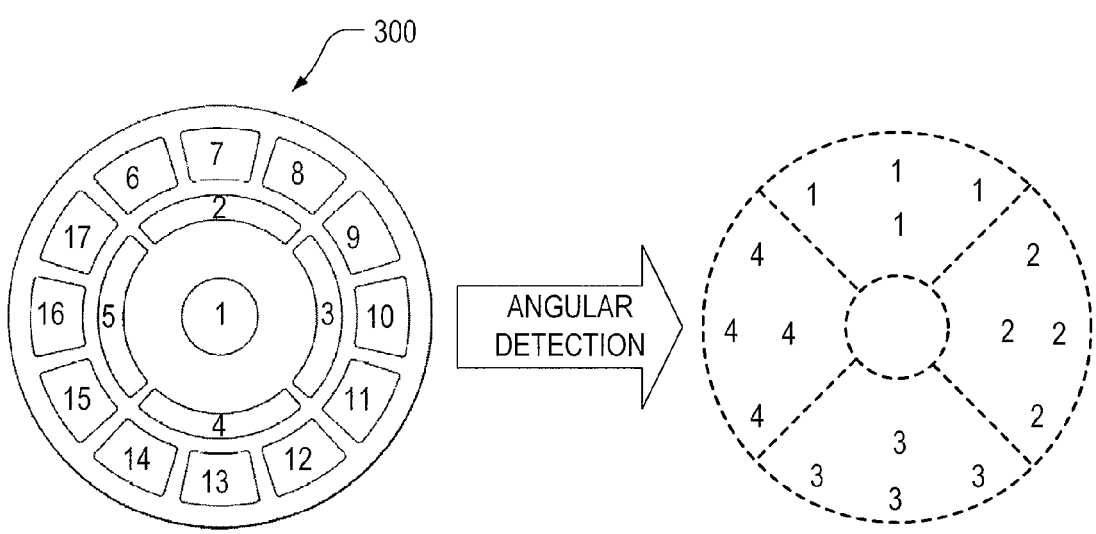

FIG. 6B illustrates an example of another type of group detect mode in which the sensor elements of a grouping are arranged in an angular sector about a center point of sensor element arrangement 300. This mode may be referred to as an "angular detection" mode for example. In the illustrated embodiment, sensor elements 2-6-7-8 form a first grouping, sensor elements 3-9-10-11 form a second grouping, sensor elements 4-12-13-14 form a third grouping, and sensor elements 5-15-16-17 form a fourth grouping. In this group detect mode, the input device can determine a single angular position (e.g., top quadrant) based on an input sensed by any of the sensor elements in the first grouping. Similarly, single angular positions (e.g., right quadrant, bottom quadrant, left quadrant) can be determined based on inputs sensed by any of the sensor elements in each of the second, third and fourth groupings, respectively. Accordingly, in this example, only four combined sensor elements needed to be scanned in group detect mode in order to determine an angular position of an input, rather than 17 individual sensor elements being scanned in full detect mode in order to determine an absolute position of the input.

Using sensor configurations in group detect mode can be advantageous in a low-power mode, for example. In a low-power mode using a group detect mode sensor configuration, power can be conserved by scanning less than all sensor elements, and identification of only a radial or angular position, and not an absolute position, may be sufficient. Once an input is detected, the input device can switch the sensor configuration to a higher resolution mode, such as the full detect mode for example.

Further, a sensor configuration in radial detection mode can be utilized by an omnidirectional input device, for example, to detect a linear swipe event irrespective of the orientation of the input device.

According to other embodiments, the input device can operate in a single detection mode in which sensor configurations are switched.

For example, the input device can operate in a partial detect mode in which sensor configurations are switched based on an orientation of a portable computing device. For instance, in a "orientation bias" mode, the input device can switch which subsets of its sensor elements are enabled so that a predefined pattern of the enabled sensor elements has the same orientation relative to a user of the portable computing device at any device orientation.

Figure 7:
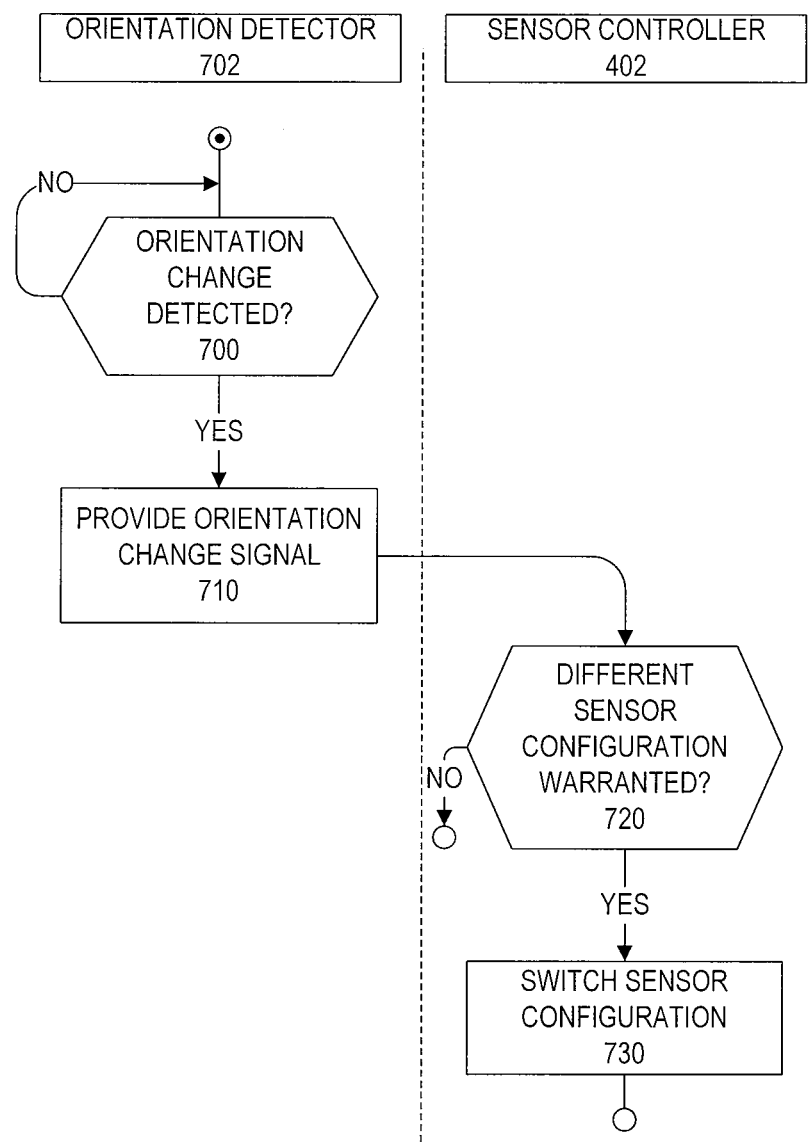
FIG. 7 illustrates an example of a switchable sensor configuration process based on orientation change.

An example of this orientation bias mode, in which the predefined pattern corresponds to a horizontal swipe pattern, is illustrated by the process shown in FIG. 7 and the switchable sensor configurations shown in FIG. 8.

In FIG. 7, an electronic device, which may generally correspond to those described above, may include orientation detector 702 and sensor controller 402. In the example process, when orientation detector 702 detects (step 700) a change in an orientation of the electronic device, it provides (step 710) a signal to sensor controller 402 identifying a new device orientation. Sensor controller 402 makes a determination (step 720) as to whether the change in orientation warrants a change in the current sensor configuration. If sensor controller 402 determines that a change in sensor configuration is warranted, sensor controller 402 switches (step 730) the current sensor configuration based upon the identified electronic device orientation. If sensor controller 402 determines that a change in sensor configuration is not warranted, the current sensor configuration remains in effect.

Figure 8A:
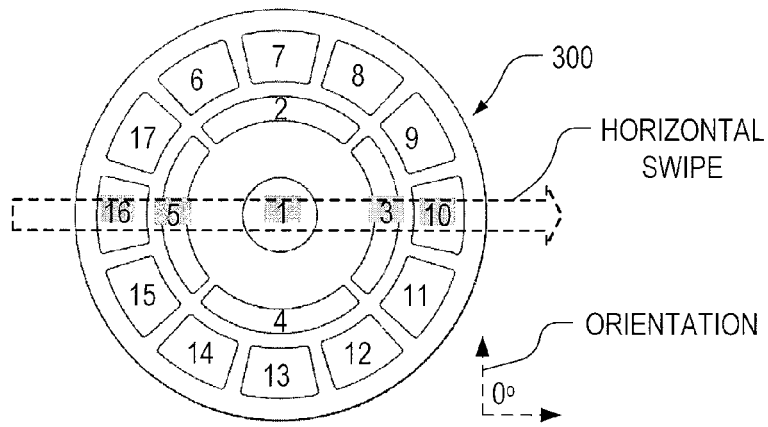
FIG. 8 illustrates an example of a switchable sensor configurations based on orientation change.
Figure 8B:
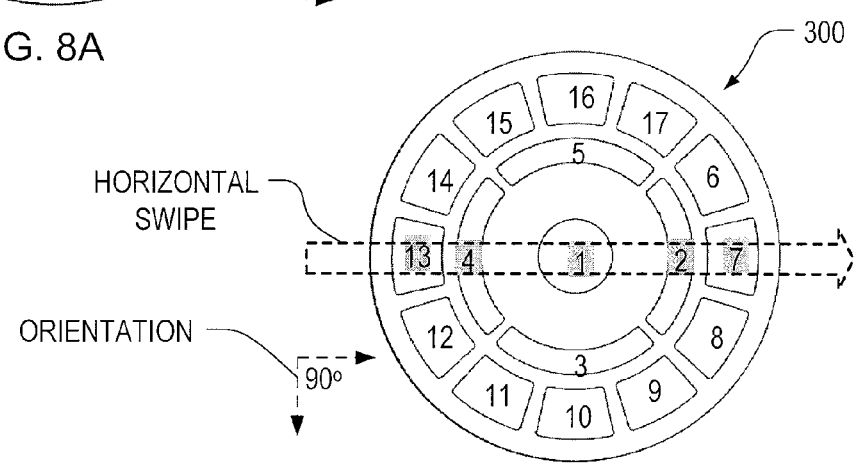
Figure 8C:
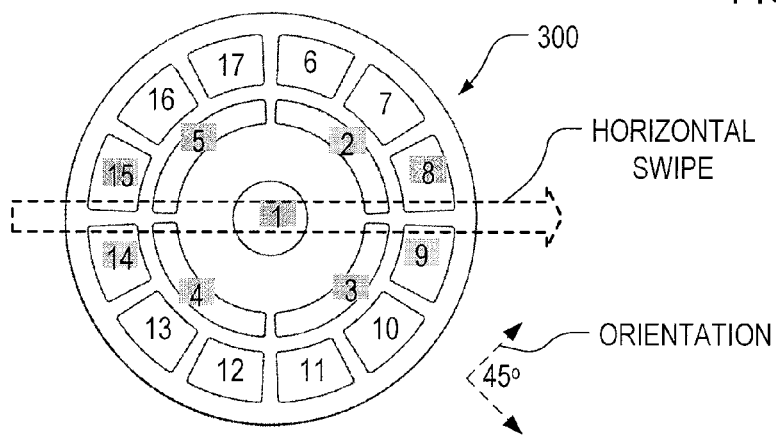

In FIG. 8A, sensor element arrangement 300 is depicted in an upright orientation. In this orientation, the input device operates in a first partial detect mode sensor configuration such that only sensor elements 16-5-1-3-10, for example, are enabled to sense input. When the electronic device rotates by approximately 90 degrees, for example, from the upright orientation, as depicted in FIG. 8B, controller 402 can switch from the first partial detect mode sensor configuration to a second partial detect mode sensor configuration such that only sensor elements 13-4-1-2-7, for example, are enabled to sense input. In this manner, a horizontal swipe event relative to the user can still be captured at any orientation of the electronic device. Similarly, when the electronic device rotates by approximately 45 degrees, for example, from the upright orientation, as depicted in FIG. 8C, controller 402 can switch from the second partial detect mode sensor configuration to a third partial detect mode sensor configuration such that only sensor elements 14-15-4-5-2-3-8-9, for example, are enabled to sense input.

In another example of a single detection mode in which sensor configurations are switched, the input device can operate in a group detect mode in which sensor configurations are switched to determine a position of an input on the touch sensitive surface. An example process of this "switch detect" mode is illustrated in FIG. 9.

Figure 9:
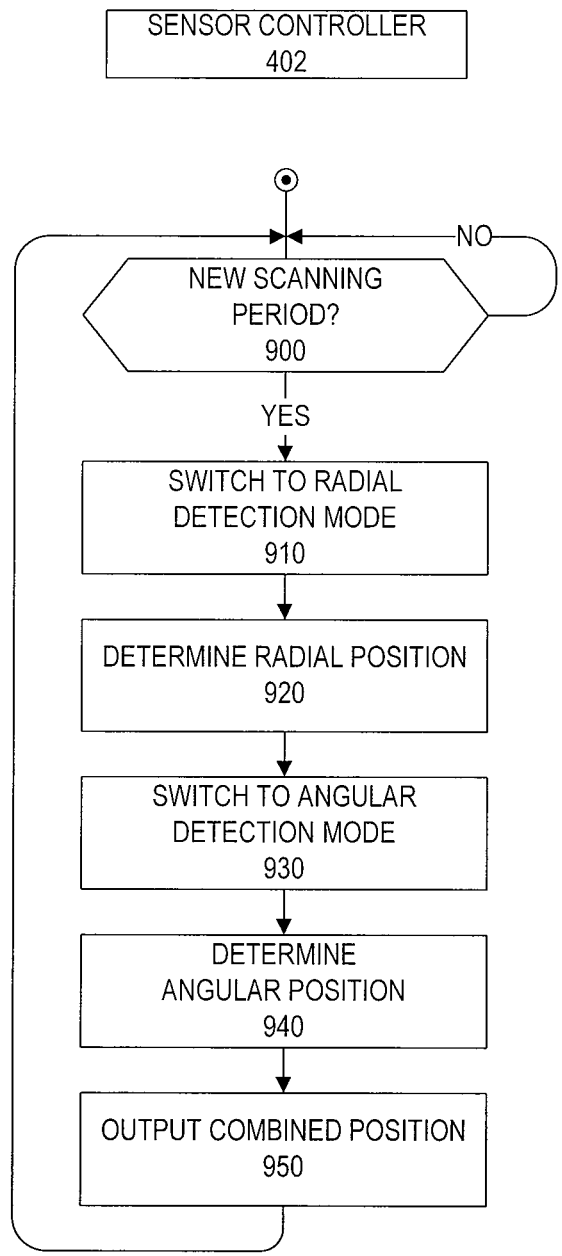
FIG. 9 illustrates an example of switching sensor configurations to determine an input position.

In FIG. 9, when a new scanning period has arrived (step 900), sensor controller 402 can switch between a radial detection mode sensor configuration (step 910) to determine a radial position of an input (step 920), and an angular detection sensor configuration (step 930) to determine an angular position of the input (step 940). Sensor controller 402 can then output a combined radial and angular position of the input (step 950). By combining in one switch detect mode the sensor configurations of the radial detection mode and angular detection mode of FIGS. 6A and 6B for example, a lower resolution position can be determined by scanning only 7 combined sensor elements groupings (3 in radial detection mode, 4 in angular detection mode), instead of scanning all 17 individual sensor elements in full detect mode to determine a higher resolution position.

In the present embodiments, the input device can switch between sensor configurations based on any number of factors, including for example a context of an application running on the electronic device. For example, an application context may cause a switch in sensor configurations in response to a change in the user's environment. In one embodiment, a security application can activate a "security" mode after a particular period of inactivity of the input device. In activating this mode, the sensor configuration can be switched to enable a reduced subset of sensor elements to sense a particular type of input to allow access to the electronic device.

Figure 10:
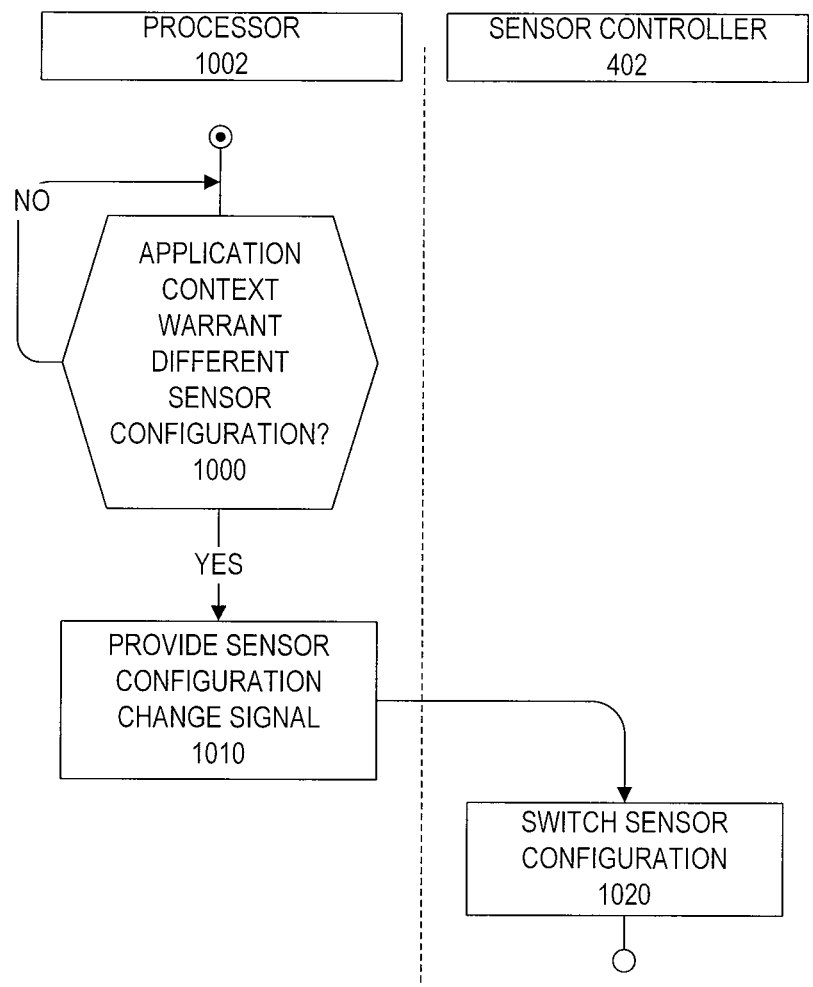
FIG. 10 illustrates an example of a switchable sensor configuration process.
Figure 11A:
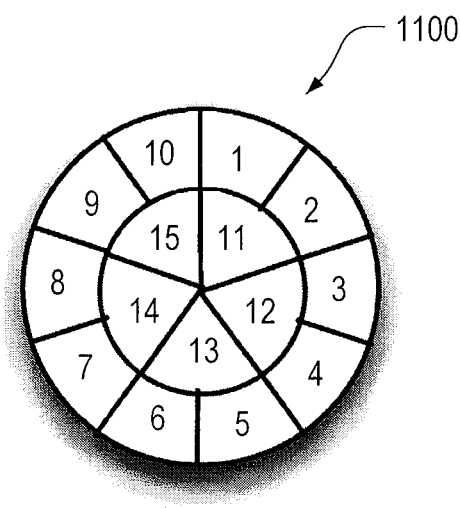
FIGS. 11A-11C illustrate examples of 15-element capacitive sensor element arrangements.
Figure 11B:
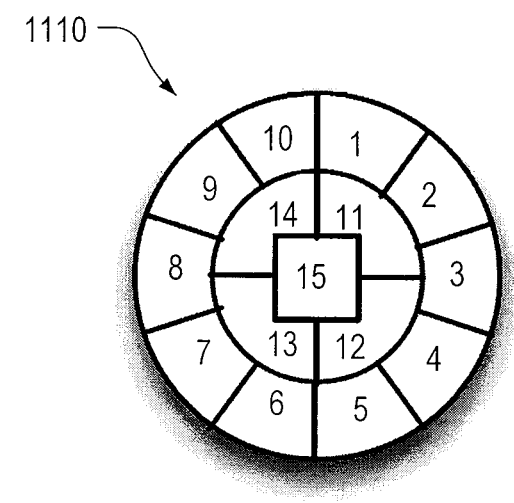
Figure 11C:
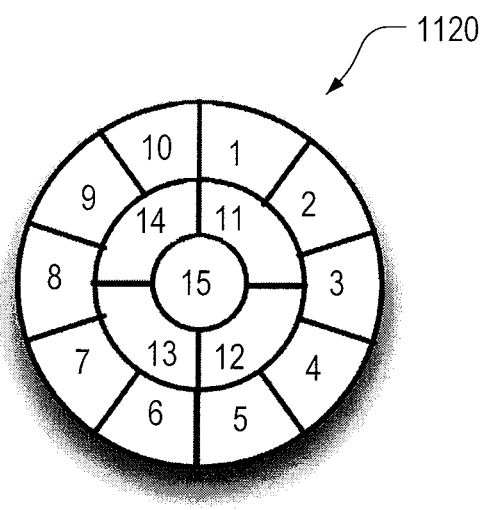

As illustrated in the example process of FIG. 10, the electronic device may include processor 1002 and sensor controller 402. In this example, processor 1002 can detect (step 1000) a change in an application context corresponding to an application running on the electronic device. Then, in response, it can provide (step 1010) a signal to sensor controller 402 identifying a new sensor configuration to be employed. Upon receipt of this signal, sensor controller 402 can switch (step 1020) the current sensor configuration to the sensor configuration identified in the signal from processor 1002.

It is noted that in the present examples controller 402 can interact with the sensor elements to determine a position of an input on the touch sensitive surface, and provide the position information to processor 1002. However, in other embodiments, the functionality associated with sensor controller 402 can be similarly performed in whole or in part by processor 1002.

Figure 14A:
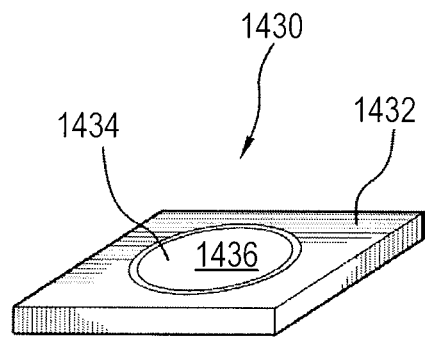
FIGS. 14A-14C illustrate an example of operations of an input device.
Figure 14B:
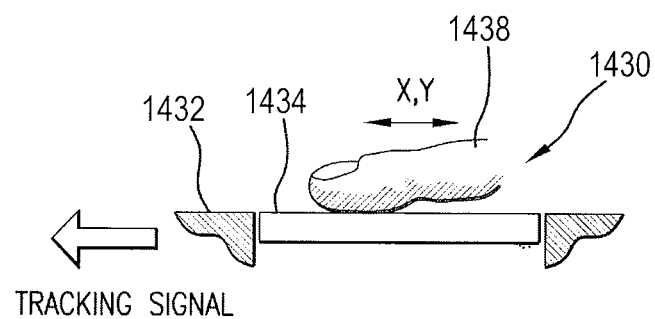
Figure 14C:
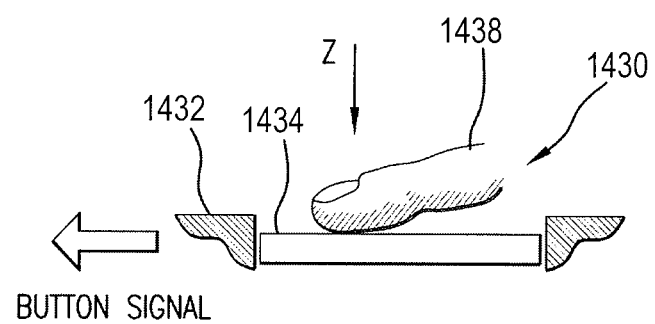

FIGS. 14A-14C illustrate operations of an input device according to some embodiments of the present disclosure. By way of example, the input device may generally correspond to any of the input devices mentioned above. In the example shown in FIG. 14A, input device 1430 can be configured to send information or data to an electronic device in order to perform an action on a display screen (e.g., via a graphical user interface). Examples of actions that may be performed include, moving an input pointer, making a selection, providing instructions, etc. The input device can interact with the electronic device through a wired connection (e.g., cable/connector) or a wireless connection (e.g., IR, Bluetooth, etc.). Input device 1430 may be a stand alone unit or it may be integrated into the electronic device. As a stand alone unit, the input device can have its own enclosure. When integrated into an electronic device, the input device can typically use the enclosure of the electronic device. In either case, the input device can be structurally coupled to the enclosure, as for example, through screws, snaps, retainers, adhesives and the like. In some cases, the input device may be removably coupled to the electronic device, as for example, through a docking station. The electronic device to which the input device may be coupled can correspond to any consumer related electronic product. By way of example, the electronic device can correspond to a computer such as a desktop computer, laptop computer or PDA, a media player such as a music player, a communication device such as a cellular phone, another input device such as a keyboard, and the like.

As shown in FIG. 14A, in this embodiment input device 1430 may include frame 1432 (or support structure) and touch pad 1434. Frame 1432 can provide a structure for supporting the components of the input device. Frame 1432 in the form of a housing can also enclose or contain the components of the input device. The components, which may include touch pad 1434, can correspond to electrical, optical and/or mechanical components for operating input device 1430. Frame 1432 may be a separate component or it may be an integral component of the housing of the electronic device.

Touch pad 1434 can provide location information for an object, such as a finger for example, in contact with or in proximity to the touch pad. This information can be used in combination with information provided by a movement indicator to generate a single command associated with the movement of the touch pad. The touch pad may be used as an input device by itself; for example, the touch pad may be used to scroll through a list of items on the device.

The shape, size and configuration of touch pad 1434 may be widely varied. In addition to the touchpad configurations disclosed above, a conventional touch pad based on the Cartesian coordinate system, or based on a Polar coordinate system can be configured to provide scrolling using rotational movements and can be configured to accept the multi-touch and gestures, for example those described herein. An example of a touch pad based on polar coordinates may be found in U.S. Pat. No. 7,046,230 which is incorporated by reference above. Furthermore, touch pad 1434 can be used in at least two different modes, which may be referred to as a relative mode and an absolute mode. In absolute mode, touch pad 1434 can, for example, report the absolute coordinates of the location at which it may be touched. For example, these would be "x" and "y" coordinates in the case of a standard Cartesian coordinate system or $(r,\theta)$ in the case of a Polar coordinate system. In relative mode, touch pad 1434 can report the direction and/or distance of change, for example, left/right, up/down, and the like. In most cases, the signals produced by touch pad 1434 can direct movement on the display screen in a direction similar to the direction of the finger as it may be moved across the surface of touch pad 1434.

Further examples of touch pad configurations may be found in U.S. patent application Ser. No. 10/949,060 entitled "Raw Data Track Pad Device and System," filed Sep. 24, 2004, U.S. patent application Ser. No. 11/203,692 entitled "Method of Increasing the Spatial Resolution of Touch Sensitive Devices," filed Aug. 15, 2005, and U.S. patent application Ser. No. 11/818,395 entitled "Touch Screen Stack-Ups," filed Jun. 13, 2007, all of which are incorporated herein by reference in their entireties.

Further examples of touch pad sensing may be found in U.S. patent application Ser. No. 10/903,964 entitled "Gestures for Touch Sensitive Input Devices," filed Jul. 30, 2004, U.S. patent application Ser. No. 11/038,590 entitled "Mode-Based Graphical User Interfaces for Touch Sensitive Input Devices," filed Jan. 18, 2005, U.S. patent application Ser. No. 11/048,264 entitled "Gestures for Touch Sensitive Input Devices," filed Jan. 31, 2005, U.S. patent application Ser. No. 11/232,299 entitled "System and Method for Processing Raw Data of Track Pad Device," filed Sep. 21, 2005, and U.S. patent application Ser. No. 11/619,464 entitled "Multi-Touch Input Discrimination," filed Jan. 3, 2007, all of which are incorporated herein by reference in their entireties.

The shape of touch pad 1434 may be widely varied. For example, it may be circular, oval, square, rectangular, triangular, and the like. In general, the outer perimeter can define the working boundary of touch pad 1434. In the embodiment illustrated in FIG. 14, the touch pad may be circular. Circular touch pads can allow a user to continuously swirl a finger in a free manner, i.e., the finger may be rotated through 360 degrees of rotation without stopping. This form of motion can produce incremental or accelerated scrolling through a list of songs being displayed on a display screen, for example. Furthermore, the user may rotate his or her finger tangentially from all sides, thus providing more finger position range. Both of these features may help when performing a scrolling function. Furthermore, the size of touch pad 1434 can accommodate manipulation by a user (e.g., the size of a finger tip or larger).

Touch pad 1434, which can generally take the form of a rigid platform. The rigid platform may be planar, convex or concave, and may include touchable outer surface 1436, which may be textured, for receiving a finger or other object for manipulation of the touch pad. Although not shown in FIG. 14A, beneath touchable outer surface 1436 can be a sensor arrangement that may be sensitive to such things as the pressure and movement of a finger thereon. The sensor arrangement may typically include a plurality of sensors that can be configured to activate as the finger sits on, taps on or passes over them. In the simplest case, an electrical signal can be produced each time the finger is positioned over a sensor. The number of signals in a given time frame may indicate location, direction, speed and acceleration of the finger on touch pad 1434, i.e., the more signals, the more the user moved his or her finger. In most cases, the signals can be monitored by an electronic interface that converts the number, combination and frequency of the signals into location, direction, speed and acceleration information. This information can then be used by the electronic device to perform the desired control function on the display screen. The sensor arrangement may be widely varied. By way of example, the sensors can be based on resistive sensing, surface acoustic wave sensing, pressure sensing (e.g., strain gauge), optical sensing, capacitive sensing and the like.

In the embodiment illustrated in FIG. 14, touch pad 1434 may be based on capacitive sensing. In most cases, the capacitive touch pad may include a protective shield, one or more electrode layers, a circuit board and associated electronics including an application specific integrated circuit (ASIC). The protective shield can be placed over the electrodes, the electrodes can be mounted on the top surface of the circuit board, and the ASIC can be mounted on the bottom surface of the circuit board. The protective shield may serve to protect the underlayers and to provide a surface for allowing a finger to slide thereon. The surface may generally be smooth so that the finger does not stick to it when moved. The protective shield also may provide an insulating layer between the finger and the electrode layers. The electrode layer may include a plurality of spatially distinct electrodes. Any suitable number of electrodes can be used. As the number of electrodes increases, the resolution of the touch pad also increases.

In accordance with one embodiment, touch pad 1434 can be movable relative to the frame 1432. This movement can be detected by a movement detector that generates another control signal. By way of example, touch pad 1434 in the form of the rigid planar platform can rotate, pivot, slide, translate, flex and/or the like relative to frame 1432. Touch pad 1434 can be coupled to frame 1432 and/or it can be movably restrained by frame 1432. By way of example, touch pad 1434 can be coupled to frame 1432 through axels, pin joints, slider joints, ball and socket joints, flexure joints, magnets, cushions and/or the like. Touch pad 1434 can also float within a space of the frame (e.g., gimbal). It should be noted that input device 1430 may additionally include a combination of joints such as a pivot/translating joint, pivot/flexure joint, pivot/ball and socket joint, translating/flexure joint, and the like to increase the range of movement (e.g., increase the degree of freedom).

When moved, touch pad 1434 can be configured to actuate a movement detector circuit that generates one or more signals. The circuit may generally include one or more movement detectors such as switches, sensors, encoders, and the like.

In the embodiment illustrated in FIG. 14, touch pad 1434 can be part of a depressible platform. The touch pad can operate as a button and perform one or more mechanical clicking actions. Multiple functions or the same function of the device may be accessed by depressing the touch pad 1434 in different locations. A movement detector signals that touch pad 1434 has been depressed, and touch pad 1434 signals a location on the platform that has been touched. By combining both the movement detector signals and touch pad signals, touch pad 1434 acts like multiple buttons such that depressing the touch pad at different locations corresponds to different buttons. As shown in FIGS. 14B and 14C, according to one embodiment touch pad 1434 can be capable of moving between an upright position (FIG. 14B) and a depressed position (FIG. 14C) when a requisite amount of force from finger 1438, palm, hand or other object is applied to touch pad 1434. Touch pad 1434 can be spring biased in the upright position, as for example through a spring member. Touch pad 1434 moves to the depressed position when the spring bias is overcome by an object pressing on touch pad 1434.

As shown in FIG. 14B, touch pad 1434 generates tracking signals when an object such as a user's finger is moved over the top surface of the touch pad in the x, y plane. As shown in FIG. 14C, in the depressed position (z direction), touch pad 1434 generates positional information and a movement indicator generates a signal indicating that touch pad 1434 has moved. The positional information and the movement indication can be combined to form a button command. Different button commands or the same button command can correspond to depressing touch pad 1434 in different locations. The different commands may be used for various functionalities including, but not limited to, making selections or issuing commands associated with operating an electronic device. By way of example, in the case of a music player, the button commands may be associated with opening a menu, playing a song, fast forwarding a song, seeking through a menu and the like.

To elaborate, touch pad 1434 can be configured to actuate a movement detector, which together with the touch pad positional information, can form a button command when touch pad 1434 is moved to the depressed position. The movement detector can be located within frame 1432 and coupled to touch pad 1434 and/or frame 1432. The movement detector may be any combination of switches and sensors. Switches can be generally configured to provide pulsed or binary data such as activate (on) or deactivate (off). By way of example, an underside portion of touch pad 1434 can be configured to contact or engage (and thus activate) a switch when the user presses on touch pad 1434. The sensors, on the other hand, can be generally configured to provide continuous or analog data. By way of example, the sensor can be configured to measure the position or the amount of tilt of touch pad 1434 relative to the frame when a user presses on the touch pad 1434. Any suitable mechanical, electrical and/or optical switch or sensor may be used. For example, tact switches, force sensitive resistors, pressure sensors, proximity sensors, and the like may be used. In some case, the spring bias for placing touch pad 1434 in the upright position may be provided by a movement detector that includes a spring action. In other embodiments, input device 1430 can include one or more movement detectors in various locations positioned under and/or above touch pad 1434 to form button commands associated with the particular locations in which the movement detector is actuated.

Touch pad 1434 may also be configured to provide a force feedback response. An example of touch pad configuration providing a haptic feedback response may be found in U.S. Pat. No. 6,337,678 entitled "Force Feedback Computer Input and Output Device with Coordinated Haptic Elements," which is incorporated herein by reference in its entirety.

Figure 15:
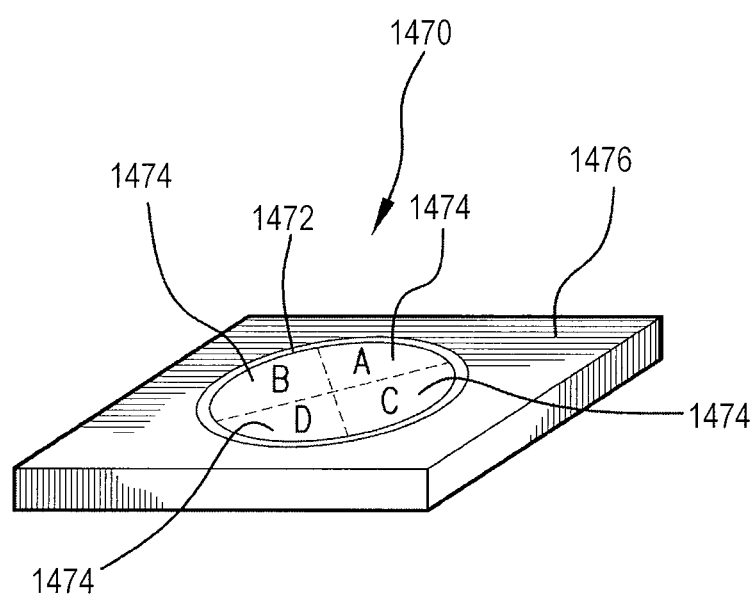
FIG. 15 illustrates an example of an input device.

FIG. 15 illustrates a simplified perspective diagram of input device 1470. Like the input device shown in the embodiment of FIGS. 14A-14C, this input device 1470 incorporates the functionality of one or more buttons directly into touch pad 1472, i.e., the touch pad acts like a button. In this embodiment, however, touch pad 1472 can be divided into a plurality of independent and spatially distinct button zones 1474. Button zones 1474 may represent regions of the touch pad 1472 that can be moved by a user to implement distinct button functions or the same button function. The dotted lines may represent areas of touch pad 1472 that make up an individual button zone. Any number of button zones may be used, for example, two or more, four, eight, etc. In the embodiment illustrated in FIG. 15, touch pad 1472 may include four button zones 1474 (i.e., zones A-D).

As should be appreciated, the button functions generated by pressing on each button zone may include selecting an item on the screen, opening a file or document, executing instructions, starting a program, viewing a menu, and/or the like. The button functions may also include functions that make it easier to navigate through the electronic system, as for example, zoom, scroll, open different menus, home the input pointer, perform keyboard related actions such as enter, delete, insert, page up/down, and the like. In the case of a music player, one of the button zones may be used to access a menu on the display screen, a second button zone may be used to seek forward through a list of songs or fast forward through a currently playing song, a third button zone may be used to seek backwards through a list of songs or fast rearward through a currently playing song, and a fourth button zone may be used to pause or stop a song that may be in the process of being played.

To elaborate, touch pad 1472 can be capable of moving relative to frame 1476 so as to create a clicking action. Frame 1476 can be formed from a single component or a combination of assembled components. The clicking action can actuate a movement detector contained inside frame 1476. The movement detector can be configured to sense movements of the button zones during the clicking action and to send a signal corresponding to the movement to the electronic device. By way of example, the movement detectors may be switches, sensors and/or the like.

In addition, touch pad 1472 can be configured to send positional information on what button zone may be acted on when the clicking action occurs. The positional information can allow the device to determine which button zone to activate when the touch pad is moved relative to the frame.

The movements of each of button zones 1474 may be provided by various rotations, pivots, translations, flexes and the like. In one embodiment, touch pad 1472 can be configured to gimbal relative to frame 1476. By gimbal, it is generally meant that the touch pad 1472 can float in space relative to frame 1476 while still being constrained thereto. The gimbal can allow the touch pad 1472 to move in single or multiple degrees of freedom (DOF) relative to the housing, for example, movements in the x, y and/or z directions and/or rotations about the x, y, and/or z axes (θxθyθz).

Figure 16:
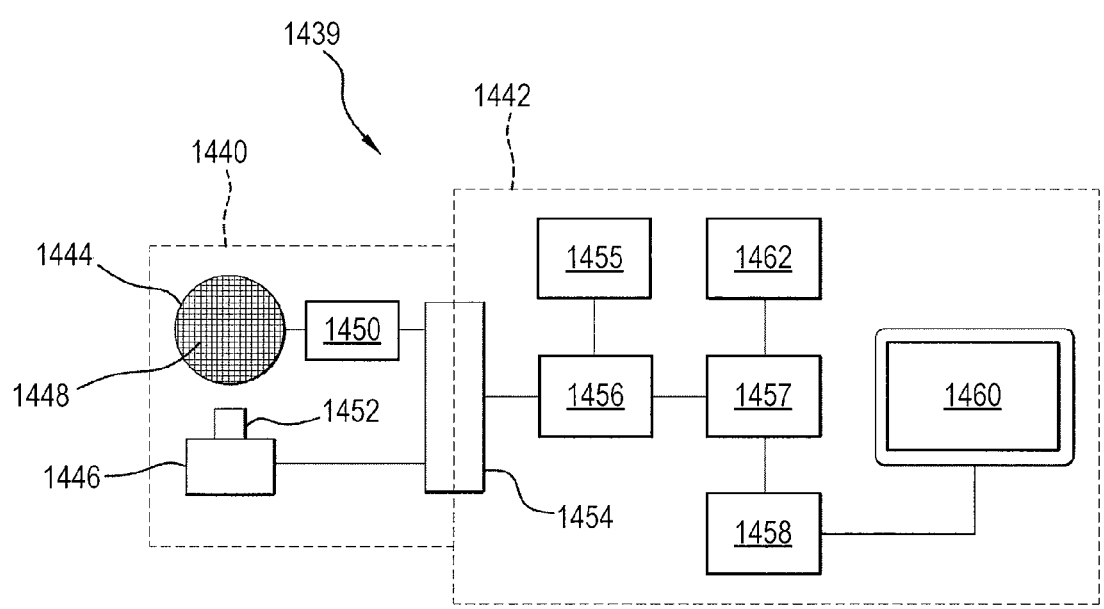
FIG. 16 illustrates an example of a computing system.

FIG. 16 illustrates an example of a simplified block diagram of a computing system 1439. The computing system may generally include input device 1440 operatively connected to computing device 1442. By way of example, input device 1440 can generally correspond to input device 1430 shown in FIGS. 14A-14C, and the computing device 1442 can correspond to a computer, PDA, media player or the like. As shown, input device 1440 may include depressible touch pad 1444 and one or more movement detectors 1446. Touch pad 1444 can be configured to generate tracking signals and movement detector 1446 can be configured to generate a movement signal when the touch pad is depressed. Although touch pad 1444 may be widely varied, in this embodiment, touch pad 1444 can include capacitance sensors 1448 and control system 1450 (which can generally correspond to the sensor controller 402) for acquiring position signals from sensors 1448 and supplying the signals to computing device 1442. Control system 1450 can include an application specific integrated circuit (ASIC) that can be configured to monitor the signals from sensors 1448, to compute the absolute location, angular location, direction, speed and/or acceleration of the monitored signals and to report this information to a processor of computing device 1442. Movement detector 1446 may also be widely varied. In this embodiment, however, movement detector 1446 can take the form of a switch that generates a movement signal when touch pad 1444 is depressed. Movement detector 1446 can correspond to a mechanical, electrical or optical style switch. In one particular implementation, movement detector 1446 can be a mechanical style switch that includes protruding actuator 1452 that may be pushed by touch pad 1444 to generate the movement signal. By way of example, the switch may be a tact or dome switch.

Both touch pad 1444 and movement detector 1446 can be operatively coupled to computing device 1442 through communication interface 1454. The communication interface provides a connection point for direct or indirect connection between the input device and the electronic device. Communication interface 1454 may be wired (wires, cables, connectors) or wireless (e.g., transmitter/receiver).

Referring to computing device 1442, it may include processor 1457 (e.g., CPU or microprocessor) configured to execute instructions and to carry out operations associated with computing device 1442. For example, using instructions retrieved from memory, the processor can control the reception and manipulation of input and output data between components of computing device 1442. Processor 1457 can be configured to receive input from both movement detector 1446 and touch pad 1444 and can form a signal/command that may be dependent upon both of these inputs. In most cases, processor 1457 can execute instruction under the control of an operating system or other software. Processor 1457 may be a single-chip processor or may be implemented with multiple components.

Computing device 1442 may also include input/output (I/O) controller 1456 that can be operatively coupled to processor 1457. (I/O) controller 1456 can be integrated with processor 1457 or it may be a separate component as shown. I/O controller 1456 can generally be configured to control interactions with one or more I/O devices that may be coupled to the computing device 1442, as for example input device 1440 and orientation detector 1455 (which can generally correspond to orientation detector 702), such as an accelerometer. I/O controller 1456 can generally operate by exchanging data between computing device 1442 and I/O devices that desire to communicate with computing device 1442.

Computing device 1442 may also include display controller 1458 that can be operatively coupled to processor 1457 (which can generally correspond to processor 1002). Display controller 1458 can be integrated with processor 1457 or it may be a separate component as shown. Display controller 1458 can be configured to process display commands to produce text and graphics on display screen 1460. By way of example, display screen 1460 may be a monochrome display, color graphics adapter (CGA) display, enhanced graphics adapter (EGA) display, variable-graphics-array (VGA) display, super VGA display, liquid crystal display (e.g., active matrix, passive matrix and the like), cathode ray tube (CRT), plasma displays and the like. In the embodiment illustrated in FIG. 16, the display device corresponds to a liquid crystal display (LCD).

In some cases, processor 1457 together with an operating system operates to execute computer code and produce and use data. The computer code and data can reside within program storage area 1462 that may be operatively coupled to processor 1457. Program storage area 1462 can generally provide a place to hold data that may be used by computing device 1442. By way of example, the program storage area may include Read-Only Memory (ROM), Random-Access Memory (RAM), hard disk drive and/or the like. The computer code and data could also reside on a removable program medium and loaded or installed onto the computing device when needed. In one embodiment, program storage area 1462 can be configured to store information for controlling how the tracking and movement signals generated by the input device may be used, either alone or in combination for example, by computing device 1442 to generate an input event command, such as a single button press for example.

Figure 17A:
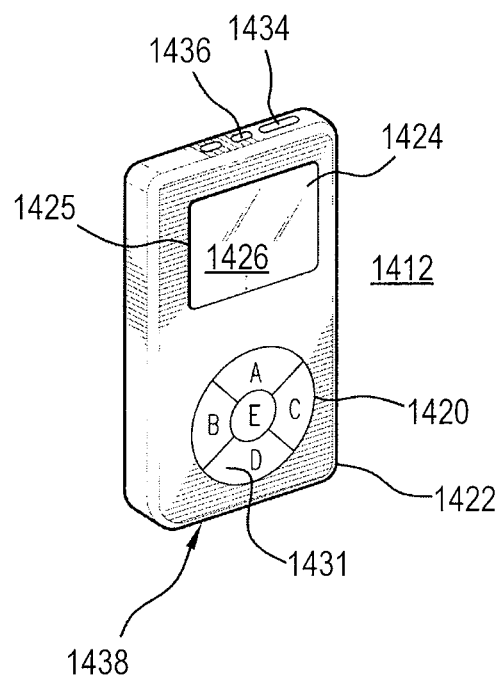
FIGS. 17A-17D illustrate examples of applications of input devices.
Figure 17B:
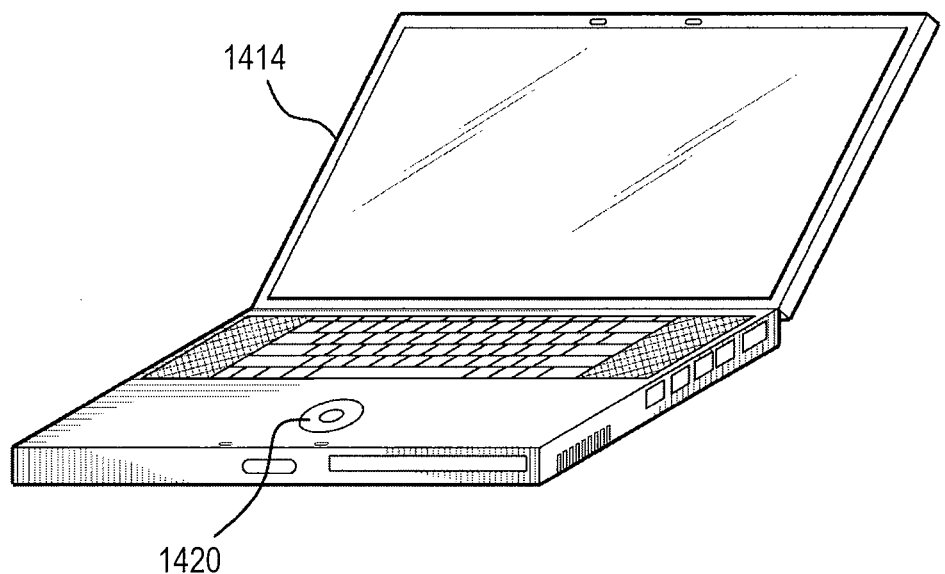
Figure 17C:
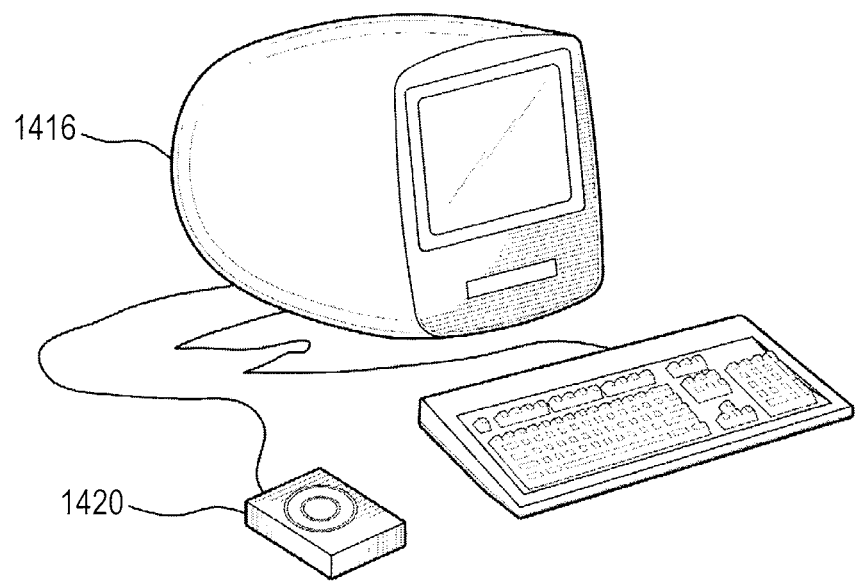
Figure 17D:
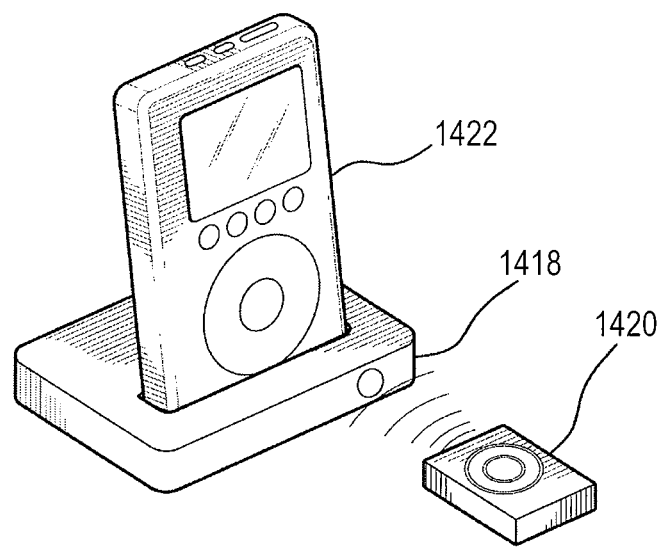

FIGS. 17A-17D illustrate applications of an input device according to some embodiments of the present disclosure. As previously mentioned, the input devices described herein can be integrated into an electronic device or they can be separate stand alone devices. FIGS. 17A-17D show some implementations of input device 1420 integrated into an electronic device. FIG. 17A shows input device 1420 incorporated into media player 1412. FIG. 17B shows input device 1420 incorporated into laptop computer 1414. FIGS. 17C and 17D, on the other hand, show some implementations of input device 1420 as a stand alone unit. FIG. 17C shows input device 1420 as a peripheral device that can be connected to desktop computer 1416. FIG. 17D shows input device 1420 as a remote control that wirelessly connects to docking station 1418 with media player 1422 docked therein. It should be noted, however, that in some embodiments the remote control can also be configured to interact with the media player (or other electronic device) directly, thereby eliminating the need for a docking station. An example of a docking station for a media player may be found in U.S. patent application Ser. No. 10/423,490, entitled "Media Player System," filed Apr. 25, 2003, which is incorporated herein by reference in its entirety. It should be noted that these particular embodiments do not limit the present disclosure and that many other devices and configurations may be used.

Referring back to FIG. 17A, media player 1412, housing 1422 and display screen 1424 may generally correspond to those described above. As illustrated in the embodiment of FIG. 17A, display screen 1424 can be visible to a user of media player 1412 through opening 1425 in housing 1422 and through transparent wall 1426 disposed in front of opening 1425. Although transparent, transparent wall 1426 can be considered part of housing 1422 since it helps to define the shape or form of media player 1412.

Media player 1412 may also include touch pad 1420 such as any of those previously described. Touch pad 1420 can generally consist of touchable outer surface 1431 for receiving a finger for manipulation on touch pad 1420. Although not illustrated in the embodiment of FIG. 17A, beneath touchable outer surface 1431 a sensor arrangement can be configured in a manner as previously described. Information provided by the sensor arrangement can be used by media player 1412 to perform the desired control function on display screen 1424. For example, a user may easily scroll through a list of songs by swirling the finger around touch pad 1420.

In addition to above, the touch pad may also include one or more movable buttons zones A-D as well as a center button E for example. The button zones can be configured to provide one or more dedicated control functions for making selections or issuing commands associated with operating media player 1412. By way of example, in the case of an MP3 music player, the button functions can be associated with opening a menu, playing a song, fast forwarding a song, seeking through a menu, making selections and the like. In some embodiments, the button functions can be implemented via a mechanical clicking action.

The position of touch pad 1420 relative to housing 1422 may be widely varied. For example, touch pad 1420 can be placed at any external surface (e.g., top, side, front, or back) of housing 1422 accessible to a user during manipulation of media player 1412. In some embodiments, touch sensitive surface 1431 of touch pad 1420 can be completely exposed to the user. In the embodiment illustrated in FIG. 17A, touch pad 1420 can be located in a lower front area of housing 1422. Furthermore, touch pad 1420 can be recessed below, level with, or extend above the surface of housing 1422. In the embodiment illustrated in FIG. 17A, touch sensitive surface 1431 of touch pad 1420 can be substantially flush with the external surface of housing 1422.

The shape of touch pad 1420 may also be widely varied. Although illustrated as circular in the embodiment of FIG. 17A, the touch pad can also be square, rectangular, triangular, and the like for example. More particularly, the touch pad can be annular, i.e., shaped like or forming a ring. As such, the inner and outer perimeter of the touch pad can define the working boundary of the touch pad.

Media player 1412 may also include hold switch 1434. Hold switch 1434 can be configured to activate or deactivate the touch pad and/or buttons associated therewith for example. This can be generally done to prevent unwanted commands by the touch pad and/or buttons, as for example, when the media player is stored inside a user's pocket. When deactivated, signals from the buttons and/or touch pad cannot be sent or can be disregarded by the media player. When activated, signals from the buttons and/or touch pad can be sent and therefore received and processed by the media player.

Moreover, media player 1412 may also include one or more headphone jacks 1436 and one or more data ports 1438. Headphone jack 1436 can be capable of receiving a headphone connector associated with headphones configured for listening to sound being outputted by media player 1412. Data port 1438, on the other hand, can be capable of receiving a data connector/cable assembly configured for transmitting and receiving data to and from a host device such as a general purpose computer (e.g., desktop computer, portable computer). By way of example, data port 1438 can be used to upload or download audio, video and other images to and from media player 1412. For example, the data port can be used to download songs and play lists, audio books, ebooks, photos, and the like into the storage mechanism of the media player.

Data port 1438 may be widely varied. For example, the data port can be a PS/2 port, a serial port, a parallel port, a USB port, a Firewire port and/or the like. In some embodiments, data port 1438 can be a radio frequency (RF) link or optical infrared (IR) link to eliminate the need for a cable. Although not illustrated in the embodiment of FIG. 17A, media player 1412 can also include a power port that receives a power connector/cable assembly configured for delivering power to media player 1412. In some cases, data port 1438 can serve as both a data and power port. In the embodiment illustrated in FIG. 17A, data port 1438 can be a USB port having both data and power capabilities.

Although only one data port may be shown, it should be noted that this does not limit the present disclosure and that multiple data ports may be incorporated into the media player. In a similar vein, the data port can include multiple data functionality, i.e., integrating the functionality of multiple data ports into a single data port. Furthermore, it should be noted that the position of the hold switch, headphone jack and data port on the housing may be widely varied, in that they are not limited to the positions shown in FIG. 17A. They can be positioned almost anywhere on the housing (e.g., front, back, sides, top, bottom). For example, the data port can be positioned on the top surface of the housing rather than the bottom surface as shown.

Figure 18A:
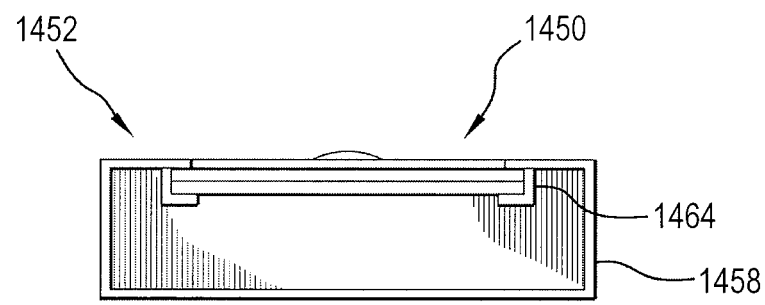
FIGS. 18A-18B illustrate an example of an installation of an input device into a media player.
Figure 18B:
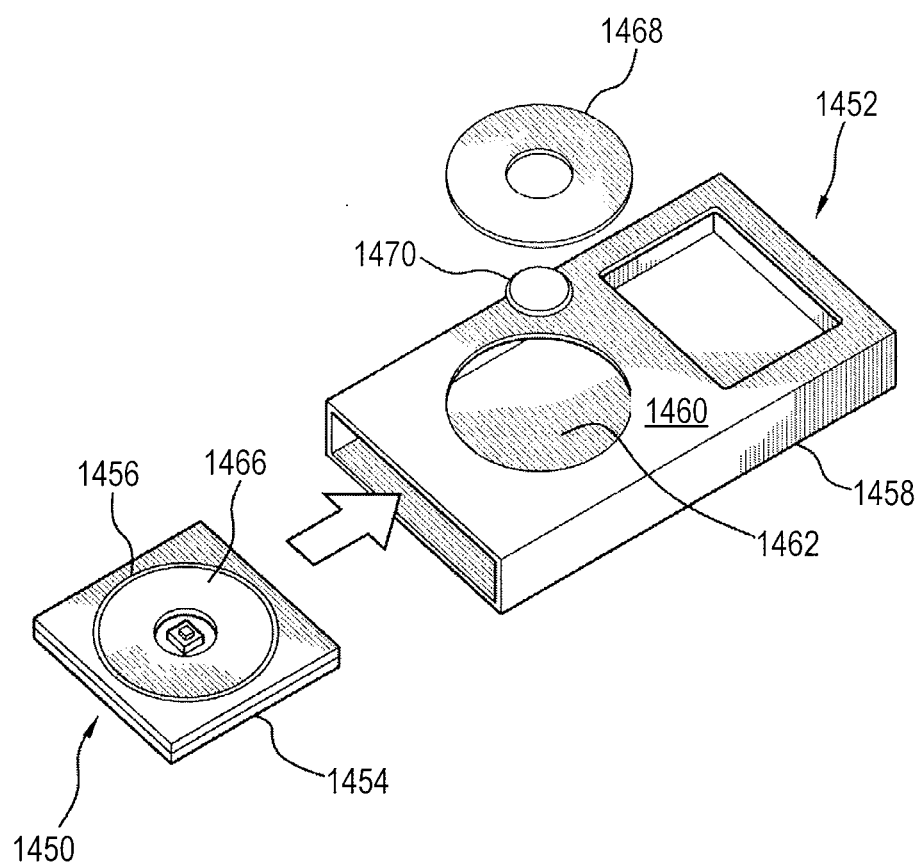

FIGS. 18A and 18B illustrate installation of an input device into a media player according to some embodiments of the present disclosure. By way of example, input device 1450 may correspond to any of those previously described and media player 1452 may correspond to the one shown in FIG. 17A. As shown, input device 1450 may include housing 1454 and touch pad assembly 1456. Media player 1452 may include shell or enclosure 1458. Front wall 1460 of shell 1458 may include opening 1462 for allowing access to touch pad assembly 1456 when input device 1450 is introduced into media player 1452. The inner side of front wall 1460 may include channel or track 1464 for receiving input device 1450 inside shell 1458 of media player 1452. Channel 1464 can be configured to receive the edges of housing 1454 of input device 1450 so that input device 1450 can be slid into its desired place within shell 1458. The shape of the channel can have a shape that generally coincides with the shape of housing 1454. During assembly, circuit board 1466 of touch pad assembly 1456 can be aligned with opening 1462 and cosmetic disc 1468 and button cap 1470 can be mounted onto the top side of circuit board 1466 for example. As shown in the embodiment illustrated in FIG. 18B, cosmetic disc 1468 can have a shape that may generally coincide with opening 1462. The input device can be held within the channel via a retaining mechanism such as screws, snaps, adhesives, press fit mechanisms, crush ribs and the like for example.

Figure 19:
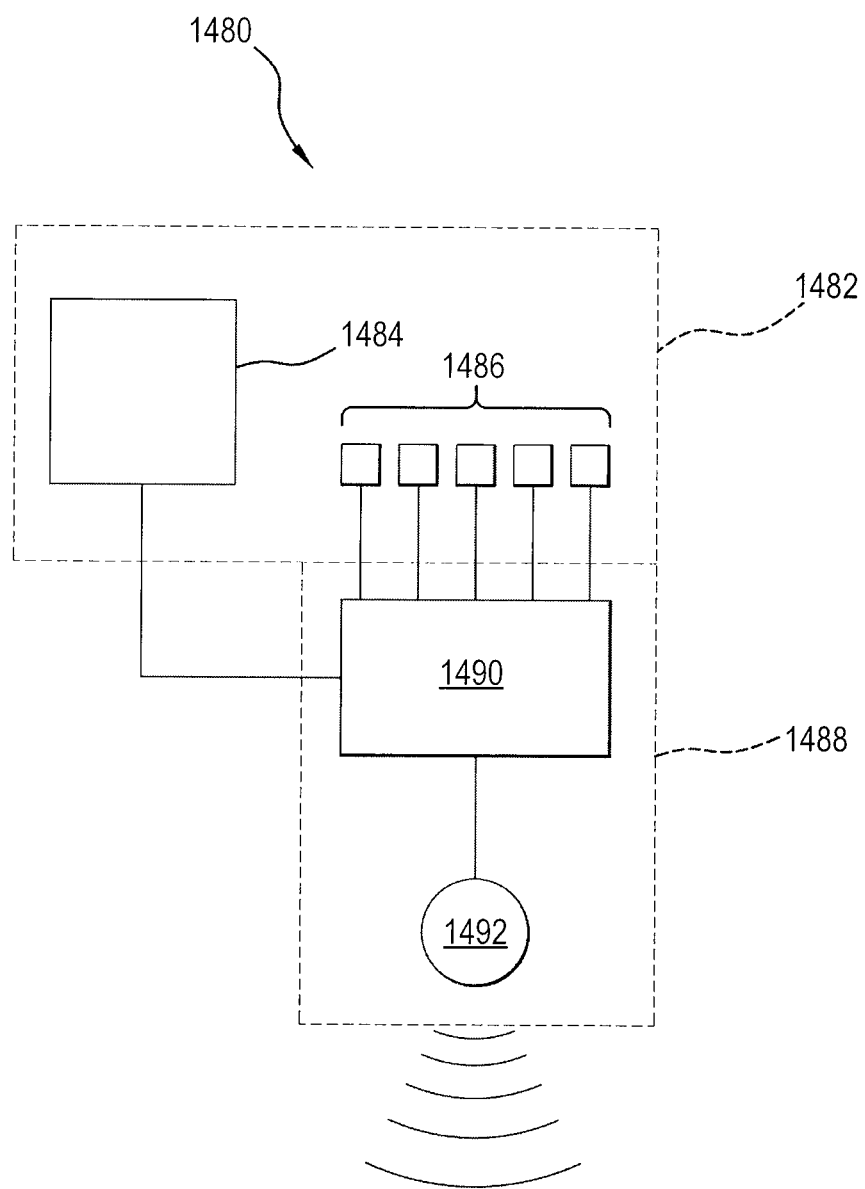
FIG. 19 illustrates an example of a remote control incorporating an input device.

FIG. 19 illustrates a simplified block diagram of a remote control incorporating an input device according to some embodiments of the present disclosure. By way of example, input device 1482 may generally correspond to any of the previously described input devices. In this particular embodiment, input device 1482 may correspond to the input device shown in FIGS. 14A-14C, thus the input device may include touch pad 1484 and plurality of switches 1486. Touch pad 1484 and switches 1486 can be operatively coupled to wireless transmitter 1488. Wireless transmitter 1488 can be configured to transmit information over a wireless communication link so that an electronic device that has receiving capabilities can receive the information over the wireless communication link. Wireless transmitter 1488 may be widely varied. For example, it can be based on wireless technologies such as FM, RF, Bluetooth, 802.11 UWB (ultra wide band), IR, magnetic link (induction) and the like for example. In the embodiment illustrated in FIG. 19, wireless transmitter 1488 can be based on IR. IR generally refers to wireless technologies that convey data through infrared radiation. As such, wireless transmitter 1488 may generally include IR controller 1490. IR controller 1490 can take the information reported from touch pad 1484 and switches 1486 and convert this information into infrared radiation, as for example using light emitting diode 1492.

It will be appreciated that the above description for clarity has described embodiments of the disclosure with reference to different functional units and processors. However, it will be apparent that any suitable distribution of functionality between different functional units or processors may be used without detracting from the disclosure. For example, functionality illustrated to be performed by separate processors or controllers may be performed by the same processors or controllers. Hence, references to specific functional units may be seen as references to suitable means for providing the described functionality rather than indicative of a strict logical or physical structure or organization.

The disclosure may be implemented in any suitable form, including hardware, software, firmware, or any combination of these. The disclosure may optionally be implemented partly as computer software running on one or more data processors and/or digital signal processors. The elements and components of an embodiment of the disclosure may be physically, functionally, and logically implemented in any suitable way. Indeed, the functionality may be implemented in a single unit, in a plurality of units, or as part of other functional units. As such, the disclosure may be implemented in a single unit or may be physically and functionally distributed between different units and processors.

One skilled in the relevant art will recognize that many possible modifications and combinations of the disclosed embodiments can be used, while still employing the same basic underlying mechanisms and methodologies. The foregoing description, for purposes of explanation, has been written with references to specific embodiments. However, the illustrative discussions above are not intended to be exhaustive or to limit the disclosure to the precise forms disclosed. Many modifications and variations can be possible in view of the above teachings. The embodiments were chosen and described to explain the principles of the disclosure and their practical applications, and to enable others skilled in the art to best utilize the disclosure and various embodiments with various modifications as suited to the particular use contemplated.

What is claimed is:

1. A method of operating a portable electronic device including a plurality of capacitive touch sensor elements arranged relative to a surface of the portable electronic device, the method comprising:
   determining whether to switch from a first position detection mode having a first sensor configuration to a second position detection mode having a second sensor configuration;
   in the first position detection mode, enabling each of the plurality of capacitive touch sensor elements in the first sensor configuration to sense a position of a touch input; and
   in the second position detection mode, enabling a first subset of the plurality of capacitive touch sensor elements in the second sensor configuration to sense the position of the touch input, and disabling a second subset of the plurality of capacitive touch sensor elements in the second sensor configuration thereby reducing power consumption.

2. The method of claim 1, wherein:
a first portion of the plurality of capacitive touch sensor elements is arranged in a first circumference relative to a first point; and
a second portion of the plurality of capacitive touch sensor elements is arranged in a second circumference relative to the first point.

3. The method of claim 1, wherein:
a first one or more groupings of capacitive touch sensor elements are arranged radially around a first point, and
a second one or more groupings of capacitive touch sensor elements are arranged in one or more angular sectors around the first point.

4. The method of claim 1, further comprising:
in the first position detection mode, determining an absolute position based on the touch input sensed by one or more of the plurality of capacitive touch sensor elements; and
in the second position detection mode, determining a radial or angular position based on the touch input sensed by one or more capacitive touch sensor elements in the first subset of the plurality of capacitive touch sensor elements.

5. The method of claim 1, further comprising arranging the enabled first subset of the plurality of capacitive touch sensor elements according to a linear input pattern.

6. The method of claim 1, further comprising arranging the enabled first subset of the plurality of capacitive touch sensor elements according to a rotational input pattern.

7. The method of claim 1, further comprising arranging the first subset of the plurality of capacitive touch sensor elements in one or more angular sectors around a first point of the surface of the portable electronic device.

8. The method of claim 1, further comprising determining whether to switch from the first position detection mode to the second position detection mode based on an orientation of the portable electronic device.

9. The method of claim 1, further comprising determining whether to switch from the first position detection mode to the second position detection mode based on a context of an application being executed.

10. The method of claim 1, further comprising determining radial and angular positions in the second position detection mode by sensing a radial position of a first grouping of the first subset of the plurality of capacitive touch sensor elements during a first period and sensing an angular position of a second grouping of the first subset of the plurality of capacitive touch sensor elements during a second period.

11. A capacitive touch input device, comprising:
a plurality of capacitive touch sensor elements arranged relative to a surface of the portable electronic device; and
a controller configured for
determining whether to switch from a first position detection mode having a first sensor configuration to a second position detection mode having a second sensor configuration,
in the first position detection mode, enabling each of the plurality of capacitive touch sensor elements in the first sensor configuration to sense a position of a touch input, and
in the second position detection mode, enabling a first subset of the plurality of capacitive touch sensor elements in the second sensor configuration to sense the position of the touch input, and disabling a second subset of the plurality of capacitive touch sensor elements in the second sensor configuration thereby reducing power consumption.

12. The device of claim 11, further comprising:
a first portion of the plurality of capacitive touch sensor elements arranged in a first circumference relative to a first point; and
a second portion of the plurality of capacitive touch sensor elements arranged in a second circumference relative to the first point.

13. The device of claim 11, further comprising:
a first one or more groupings of capacitive touch sensor elements arranged radially around a first point, and
a second one or more groupings of capacitive touch sensor elements arranged in one or more angular sectors around the first point.

14. The device of claim 11, the controller further configured for:
in the first position detection mode, determining an absolute position based on the touch input sensed by one or more of the plurality of capacitive touch sensor elements; and
in the second position detection mode, determining a radial or angular position based on the touch input sensed by one or more capacitive touch sensor elements in the first subset of the plurality of capacitive touch sensor elements.

15. The device of claim 11, wherein the enabled first subset of the plurality of capacitive touch sensor elements are arranged according to a linear input pattern.

16. The device of claim 11, wherein the enabled first subset of the plurality of capacitive touch sensor elements are arranged according to a rotational input pattern.

17. The device of claim 11, wherein the first subset of the plurality of capacitive touch sensor elements are arranged in one or more angular sectors around a first point of the surface of the portable electronic device.

18. The device of claim 11, the controller further configured for determining whether to switch from the first position detection mode to the second position detection mode based on an orientation of the portable electronic device.

19. The device of claim 11, the controller further configured for determining whether to switch from the first position detection mode to the second position detection mode based on a context of an application being executed.

20. The device of claim 11, the controller further configured for determining radial and angular positions in the second position detection mode by sensing a radial position of a first grouping of the first subset of the plurality of capacitive touch sensor elements during a first period and sensing an angular position of a second grouping of the first subset of the plurality of capacitive touch sensor elements during a second period.

* * * * *